(12) United States Patent
Lim et al.

(10) Patent No.: US 12,242,369 B2
(45) Date of Patent: Mar. 4, 2025

(54) METHOD AND SYSTEM FOR ENROLLING SERVICE PROVIDERS AND ONBOARDING VIRTUALIZED NETWORK SERVICES

(71) Applicant: Rakuten Symphony, Inc., Tokyo (JP)

(72) Inventors: Jun Liang Lim, Singapore (SG); Amalina Liang, Singapore (SG)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/020,990

(22) PCT Filed: Sep. 28, 2022

(86) PCT No.: PCT/US2022/044978
§ 371 (c)(1),
(2) Date: Feb. 13, 2023

(87) PCT Pub. No.: WO2024/072380
PCT Pub. Date: Apr. 4, 2024

(65) Prior Publication Data
US 2024/0264927 A1    Aug. 8, 2024

(51) Int. Cl.
*G06F 11/36*    (2006.01)
*G06Q 30/0601*    (2023.01)

(52) U.S. Cl.
CPC ..... *G06F 11/3664* (2013.01); *G06Q 30/0643* (2013.01)

(58) Field of Classification Search
CPC .......... G06F 11/3664; G06Q 30/0643
USPC .......................................... 717/125
See application file for complete search history.

(56) References Cited

U.S. PATENT DOCUMENTS

| | | | |
|---|---|---|---|
| 8,656,035 B2 * | 2/2014 | Thomas | G06Q 30/0641 709/219 |
| 2010/0235445 A1 | 9/2010 | Palmeri et al. | |
| 2012/0011028 A1 * | 1/2012 | Thomas | G06Q 30/0623 705/26.61 |

(Continued)

OTHER PUBLICATIONS

Tushar, Wayes, et al. "Peer-to-peer trading in electricity networks: An overview." IEEE transactions on smart grid 11.4 (2020): pp. 3185-3200. (Year: 2020).*

(Continued)

*Primary Examiner* — Satish Rampuria
(74) *Attorney, Agent, or Firm* — Sughrue Mion, PLLC

(57) ABSTRACT

A method, system, apparatus, and computer-readable medium for trading telecommunications related services on a centralized marketplace network. The method includes: receiving a user request of a first user to access the centralized marketplace; authenticating, based on the received user request, the first user; obtaining product information of a product of the authenticated first user based on a predetermined onboarding policy, the product being a virtualized network service for a telecommunications network; obtaining, based on the predetermined onboarding policy, the product for performing one or more onboarding tests of the product in a test environment of the centralized marketplace; obtaining status information of the one or more onboarding tests; and presenting the product for purchase in the central marketplace based on a result of the one or more onboarding tests.

21 Claims, 17 Drawing Sheets

(56) References Cited

U.S. PATENT DOCUMENTS

| | | | | |
|---|---|---|---|---|
| 2012/0011032 A1* | 1/2012 | Thomas | ............ | G06Q 30/0631 |
| | | | | 705/27.1 |
| 2012/0016770 A1* | 1/2012 | Thomas | ............ | G06Q 30/0641 |
| | | | | 705/26.63 |
| 2017/0374071 A1* | 12/2017 | Visuri | ................... | H04L 63/101 |
| 2019/0197621 A1* | 6/2019 | Sand | ..................... | G06Q 40/04 |
| 2021/0117242 A1 | 4/2021 | Van et al. | | |
| 2022/0012042 A1* | 1/2022 | Doshi | .................. | H04L 41/082 |
| 2022/0300296 A1* | 9/2022 | Sharma | ................ | G06F 9/3005 |

OTHER PUBLICATIONS

Bakos, Yannis. "The emerging role of electronic marketplaces on the Internet." Communications of the ACM 41.8 (1998): pp. 35-42. (Year: 1998).*

Khorasany, Mohsen, Yateendra Mishra, and Gerard Ledwich. "A decentralized bilateral energy trading system for peer-to-peer electricity markets." IEEE Transactions on industrial Electronics 67.6 (2019): pp. 4646-4657. (Year: 2019).*

Tkachuk, Roman-Valentyn, et al. "A survey on blockchain-based telecommunication services marketplaces." IEEE Transactions on Network and Service Management 19.1 (2021): pp. 228-255. (Year: 2021).*

Wang, Zan-Jun, et al. "Decentralized data marketplace to enable trusted machine economy." 2019 IEEE Eurasia Conference on IOT, Communication and Engineering (ECICE). IEEE, 2019.pp. 246-250 (Year: 2019).*

Dixit, Akanksha, et al. "Fast Data: a fair, secure, and trusted decentralized iiot data marketplace enabled by blockchain." IEEE Internet of Things Journal 10.4 (2021): pp. 2934-2944. (Year: 2021).*

International Search Report of PCT/US2022/044978 dated Jan. 3, 2023 [PCT/ISA/210].

Written Opinion of PCT/US2022/044978 dated Jan. 3, 2023 [PCT/ISA/237].

* cited by examiner

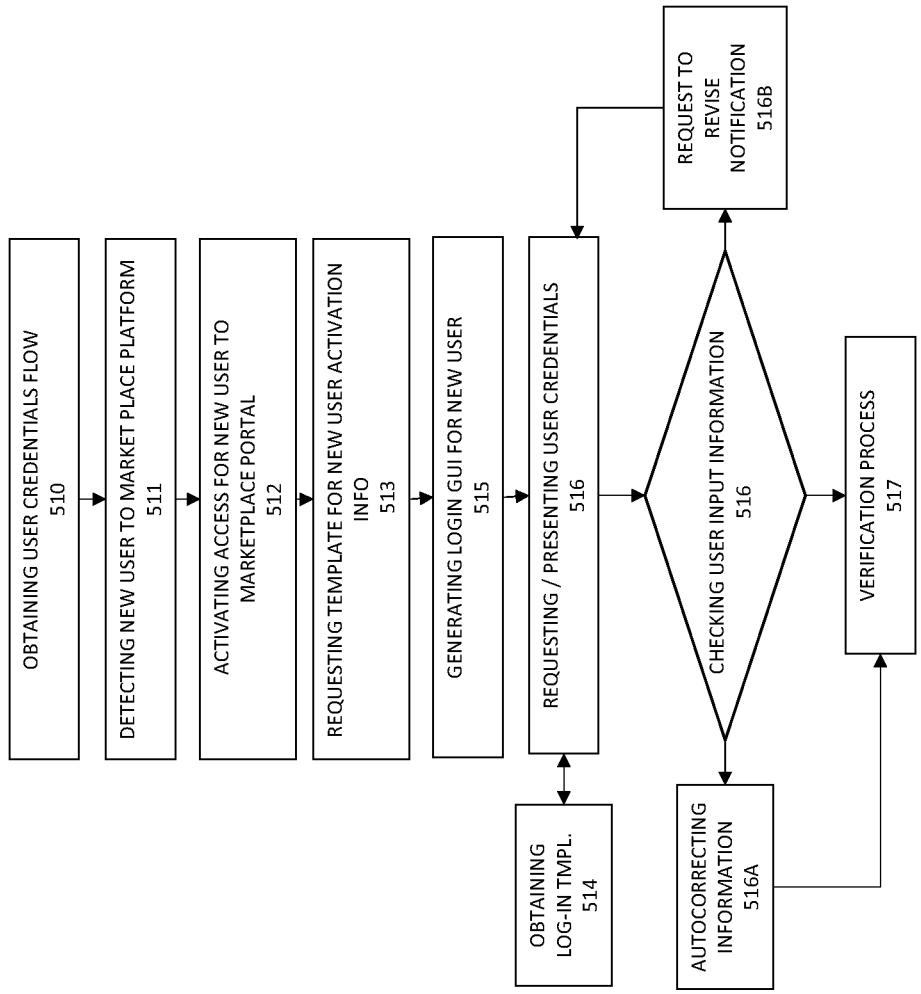

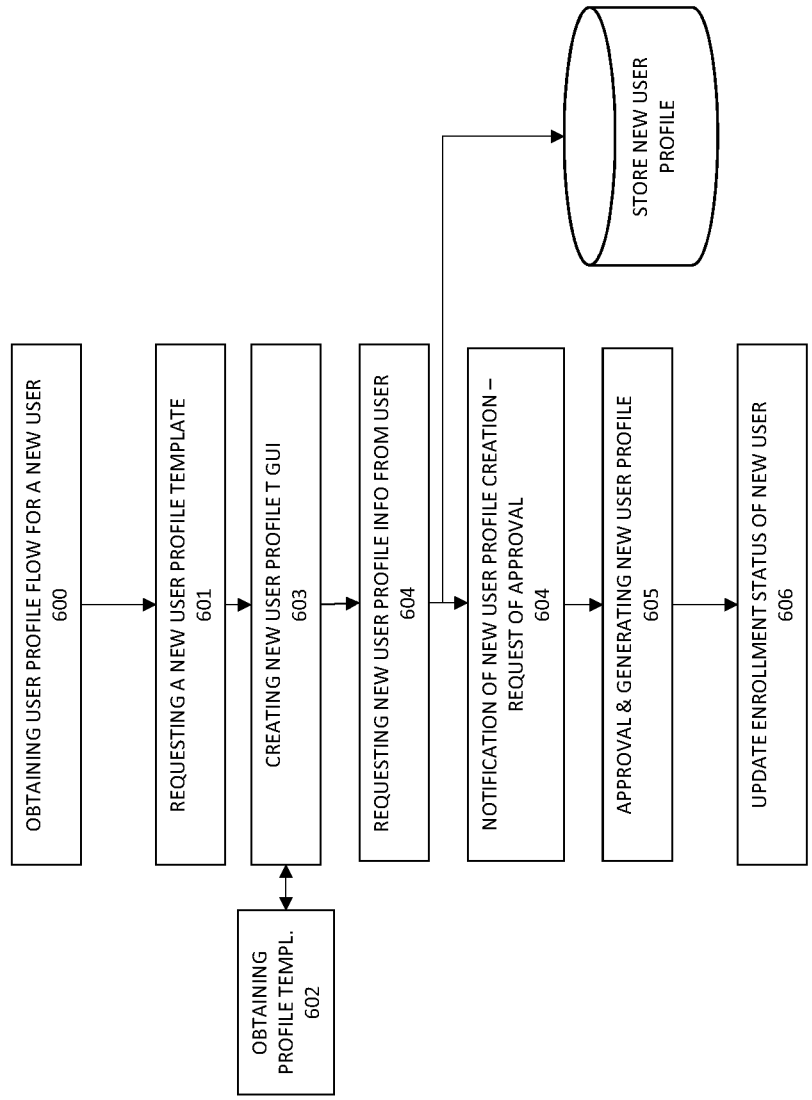

Landing page

XYYX | Application on boarding portal    Search 🔍   ❓ 🎤 🎛️ 👤

Dashboard Applications Artifactory  Source code ⌄  Access management  Get Help  Settings  Manage approvals ⌄  Permissions Displaying 26 of 32 Applications                                                                        🔍 ▽ #

| Application name | Version | Environment | Priority | Start Date | Target Date | Status |
|---|---|---|---|---|---|---|
| Product 1 | 2.1.3 | Production | p⁰ | 04/06/2021 | 04/06/2021 | Not started |
| Product 2 | 1.1.3 | Staging | p¹ | 04/06/2021 | 04/06/2021 | ARB review |
| Product 3 | 3.2.1 | Sandbox | p² | 04/06/2021 | 04/06/2021 | Resource allocation |
| Product 4 | 2.4.1 | Production | p³ | 04/06/2021 | 04/06/2021 | Bundle review |
| Product 5 | 2.4.0 | Staging | p⁰ | 04/06/2021 | 04/06/2021 | OBF integration |

Permissions

XY YX | Application onboarding portal     Search [ q 🛈 🛆 📷 🔍 ]

✓ Successfully submitted your permission request ✕

Dashboard   Applications   Artifactory   Source code ⌄   Access Management ⌄   Get Help   Settings   Manage Approvals ⌄   Permissions

Displaying 25 of 32 User                      +   🔍   ▽   ≡

| | Email | Project name | Tool | Permissions | Description |
|---|---|---|---|---|---|
| ☐ Product 1 | XYZ@gmail.com | Wordpress | Gkhub | Read | Requesting access for.... |
| ☐ Product 2 | XYZ@gmail.com | Busybox | Jerkins | Admin | Need Jerkins access.... |
| ☐ Product 3 | XYZ@gmail.com | Wordpress | Gkhub | Maintainer | Requesting access for.... |
| ☐ Product 4 | XYZ@gmail.com | Busybox | Jerkins | Write | Need Jerkins access.... |
| ☐ Product 5 | XYZ@gmail.com | Wordpress | Gkhub | Read | Requesting access for.... |

FIG. 15B

METHOD AND SYSTEM FOR ENROLLING SERVICE PROVIDERS AND ONBOARDING VIRTUALIZED NETWORK SERVICES

CROSS REFERENCE TO RELATED APPLICATIONS

This application is a National Stage of International Application No. PCT/US2022/044978, filed Sep. 28, 2022.

TECHNICAL FIELD

Methods and systems consistent with example embodiments of the present disclosure relate to enrolling service providers and onboarding virtualized network services for a centralized online marketplace platform.

BACKGROUND

The traditional market for network-related services is highly fragmented. Specifically, the telecommunications industry has one of the most complex and tedious processes for network operators to look for end-to-end solutions, service providers, vendors, or implementers to help solve and implement their network operational business plans. Thus, it can be a challenging task for a network operator to guide multiple service providers in providing the required information when a large number of service providers are involved. To this end, before vendors (e.g., service providers) can provide network services to network operators, the service providers need to enroll as registered dealers in the dealer network of the network operator. For this purpose, the vendor (e.g., service provider) may have to provide the network operator with a high level of information about its business and the service(s) to be offered. However, in a highly fragmented market where different network operators require different levels of information and formats to include vendors (e.g., service providers) in their dealer network (e.g., marketplaces), it is a challenging task for both, the network operators and the vendors (e.g., service providers) to meet the information requirements of their business partners.

When vendors (e.g., service providers) wish to enroll in a network operator's dealer network, it may be difficult for the vendors (e.g., service providers) to immediately comply with the required level of information for seamless onboarding of offered services. Most likely adjustments will be required resulting in administrative communications between the vendors (e.g., service providers) and the network operators. In particular, the task of integrating network services into a network operator's existing telecommunications infrastructure is complex and time-consuming for both sides (e.g., need a high level of collaboration between the network operators and the vendors to schedule on-site visits to the telecommunications infrastructure to integrate the network services).

The large effort that is required to deploy network services into an existing telecommunication infrastructure is particularly inefficient if the vendors (e.g., service providers) discover only after the network services have been integrated into the existing infrastructure that the network services offered are not compatible or do not function as expected. Such an outcome leaves the vendors (e.g., service providers) with no choice but to stop the integration of network services and find an appropriate solution to the problems. To this end, the vendors (e.g., service providers) need the cooperation of the network operators to either schedule another on-site visit to install new infrastructure or to upgrade the existing telecommunications infrastructure to make it compatible with the network services being offered. In some cases, the vendors (e.g., service providers) may resort to rebuilding the network services to be compatible with another vendor's (e.g., service provider's) existing telecommunications infrastructure. In other cases, a dilemma may leave the network operator with no choice but to select other vendors (e.g., service providers) for the deployment of network services.

In either case, network service deployment problems are unsatisfactory to both business partners, as network service delivery can be further delayed and human resource waste and frustration are inevitable.

As a result, network operators will generally only switch vendors (e.g., service providers) or update network services if there is an urgent need to do so. So even if an updated network service or a service with better performance is available from other vendors (e.g., service providers), it takes a long transition period before the network operator decides to deploy these better services.

Apart from the above deployment issues, the actual performance of the network services offered may vary depending on the environment and infrastructure. Therefore, it is difficult for the network operators to accurately evaluate the actual performance of the network service until the service is actually deployed to their existing telecommunication infrastructure.

SUMMARY

According to example embodiments, a method and a system are provided for enrolling service providers and onboarding virtualized network services for a centralized online marketplace platform, trading platform, and network. The centralized enrollment and onboarding enable service providers to enroll, onboard and test their network services before presenting them on the centralized online marketplace. In particular, the method and system realize a standardized and guided enrollment and onboarding process that provides a common and easy-to-review standard/format for the network provider. The enrolled service providers can upload their network services to an onboarding portal in a guided manner that allows the network operators to test the network service. The service providers get approval for their offered network services before a release to the online marketplace platform. This onboarding process gives the service provider the security of selling only approved network services to customers (e.g., network operators). Both, users (e.g., services providers) and customers (e.g., network operators) can monitor the status of the onboarding process. The users (e.g., services providers) can customize (i.e., adjust) the network services during the onboarding process to obtain clearance approval for a release of the network services to the marketplace without on-site visits to the existing network infrastructure. The network operator can customize the onboarding process (e.g., the testing environment for the network service) in a standardized and guided manner to meet the requirements for testing the network services with less effort. In particular, the network operator can control the onboarding process, for example, by providing the service provider with different levels of permissions for the onboarding test, without the risk of human error or integration failure that could affect the network operator's existing telecommunications infrastructure.

By simplifying and automating the enrollment and onboarding process of network services, as opposed to manually onboarding network services on-site, both users (e.g., service providers) and customers (e.g., network operators) of the marketplace platform can save time and resources. Moreover, the centralized enrollment and onboarding process minimizes human errors and eradicates compatibility failures. Furthermore, the centralized enrollment and onboarding process reduces business risks for users (e.g., service providers) since it provides a low-risk test environment with minimal impact on network operators. As a result, the centralized enrollment and onboarding process enables a simple, flexible, cost-effective, efficient, and rapidly implementable solution for a network service selection.

According to example embodiments, a system for enrolling service providers and onboarding virtualized network services to a centralized marketplace, the system comprising: a memory storing instructions, and at least one processor configured to execute the instructions to: receive a user request of a first user to access the centralized marketplace; authenticate, based on the received user request, the first user; obtain product information of a product of the authenticated first user based on a predetermined onboarding policy, the product being a virtualized network service for a telecommunications network; obtain, based on the predetermined onboarding policy, the product for performing one or more onboarding tests of the product in a test environment of the centralized marketplace; obtain status information of the one or more onboarding tests; and present the product for purchase in the central marketplace based on a result of the one or more onboarding tests.

The system, wherein the at least one processor, while authenticating, may further configured to execute the instructions to: determine a role of the first user registered in the centralized marketplace to be a vendor role, from among a plurality of predetermined roles comprising the vendor role and a customer role; and provide access to the centralized marketplace based on the determined role of the first user to be the vendor role.

The system, wherein the at least one processor, while obtaining of the product information, further configured to execute the instructions to: receive an onboarding request by the first user; and output a product information graphical user interface to request the first user to provide product information of the product.

The system, wherein the at least one processor, while obtaining of the product information, further configured to execute the instructions to: output an upload graphical user interface to request the first user to provide additional product information and to upload the product; obtain the additional product information and the product uploaded by the first user; and provide the additional product information for the product for verification by at least one second user.

The system, wherein the at least one processor, while obtaining the status information, further configured to execute the instructions to: output, to at least one second user, an onboarding test graphical user interface, the onboarding test graphical user interface comprising information on the one or more onboarding tests of the product in the test environment; and obtain the status information of the one or more onboarding tests from the at least one second user.

The system, wherein the at least one processor further configured to execute the instructions to provide access to the first user to update the product in response to the status information, based on an access request received from the first user or the at least one second user.

The system, wherein the at least one processor, while evaluating of the product, further configured to execute the instructions to: receive, from the at least one second user, a query input to request information from the second user in relation to the one or more onboarding tests; and output the query input to the first user.

The system, wherein the at least one processor further configured to execute the instructions to: output, to the first user, an onboarding test graphical user interface comprising the status information for the one or more onboarding tests.

The system, wherein the status information comprises at least one of: an onboarding test completion status; an onboarding test event and/or result; and a performance status of the product during the one or more onboarding tests.

According to example embodiments, a method for enrolling service providers and onboarding virtualized network services to a centralized marketplace, the method may include: receiving a user request of a first user to access the centralized marketplace; authenticating, based on the received user request, the first user; obtaining product information of a product of the authenticated first user based on a predetermined onboarding policy, the product being a virtualized network service for a telecommunications network; obtaining, based on the predetermined onboarding policy, the product for performing one or more onboarding tests of the product in a test environment of the centralized marketplace; obtaining status information of the one or more onboarding tests; and presenting the product for purchase in the central marketplace based on a result of the one or more onboarding tests.

The authenticating may include: determining a role of the first user registered in the centralized marketplace to be a vendor role, from among a plurality of predetermined roles comprising the vendor role and a customer role; and providing access to the centralized marketplace based on the determined role of the first user to be the vendor role.

The obtaining of the product information may include: receiving an onboarding request by the first user; and outputting a product information graphical user interface to request the first user to provide product information of the product.

The obtaining of the product may include: outputting an upload graphical user interface to request the first user to provide additional product information and to upload the product; obtaining the additional product information and the product uploaded by the first user; and providing the additional product information for the product for verification by at least one second user.

The obtaining the status information may include: outputting, to at least one second user, an onboarding test graphical user interface, the onboarding test graphical user interface comprising information on the one or more onboarding tests of the product in the test environment; and obtaining the status information of the one or more onboarding tests from the at least one second user.

The method may include: based on an access request received from the first user or the at least one second user, provide access to the first user to update the product in response to the status information.

The evaluating of the product may further include: receiving, from the at least one second user, a query input to request information from the second user in relation to the one or more onboarding tests; and outputting the query input to the first user.

The method further may include: outputting, to the first user, an onboarding test graphical user interface comprising the status information for the one or more onboarding tests.

The status information comprises at least one of: an onboarding test completion status; an onboarding test event and/or result; and a performance status of the product during the one or more onboarding tests.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 5B illustrates a flowchart of a method for a guided enrollment of service providers to a marketplace platform according to one or other embodiments;

FIG. 6 illustrates a flowchart of a method for creating a user profile and dashboard for a marketplace platform according to one or more embodiments;

FIG. 11 illustrates one non-limiting exemplary embodiment of an onboarding GUI portal for onboarding products to the marketplace;

FIG. 12 illustrates one non-limiting exemplary embodiment of a product upload GUI portal for onboarding products to the marketplace;

FIG. 13 illustrates a non-limiting exemplary embodiments of an onboarding test GUI portal for evaluating a product to be on boarded to the marketplace;

FIG. 14 illustrates another non-limiting exemplary embodiment of an onboarding test GUI portal for evaluating a product to be on boarded to the marketplace; and FIGS. 15A and 15B illustrate one or more non-limiting exemplary embodiments of a permission GUI portal for evaluating a product to be on boarded to the marketplace.

DETAILED DESCRIPTION

Figure 1:
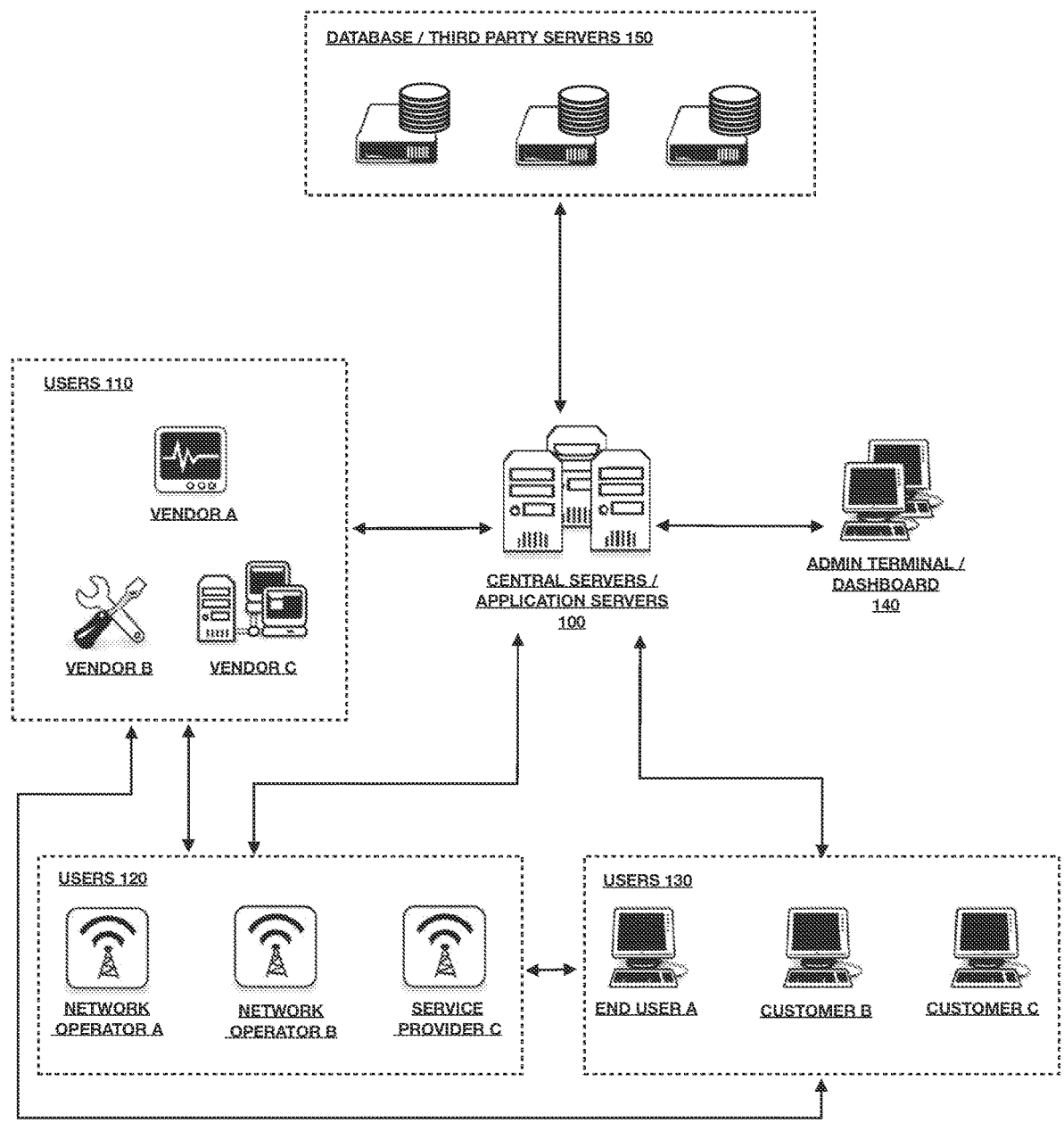
FIG. 1 illustrates a diagram of a general system architecture according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including short-range ultra-high frequency (UHF) device, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the disclosure described herein. For example, the portal can be a web page accessed with a web browser, mobile device application, or any application or software residing on a computing device.

FIG. 1 illustrates a diagram of a general network architecture according to one or more embodiments. Referring to FIG. 1, users 110, 120, and 130 can be in bi-directional communication over a secure network with central servers or application servers 100 according to one or more embodiments. In addition, users 110, 120, 130 may also be in direct bi-directional communication with each other via the marketplace platform network system according to one or more embodiments. Here, users 110 can be any type of vendor or service provider, such as vendors A, B, and C offering to either users 120 or users 130 similar, same, or different services or products with respect to a network or service operator. In particular, users 110 can provide any type of telecommunications related service or product, such as cellular service network deployment, network capacity update, operational monitoring, data analytic and reporting, and any other suitable services. Each of users 110 can communicate with servers 100 via their respective terminals or portals. Users 120 can be network operators A and B and service provider C, which may offer similar, same, or different services or products to users 130 or users 110. Here, users 110 or 120 can be any type of telecommunications vendor or network service provider, network operator, carrier, broadband provider, Unified Communications as a Service (UCaaS) providers, wired or wireless cellular network service provider, radio access network (RAN), web host, or any network or telecommunications related service or network provider, among others. Each of users 120 can communicate with servers 100 via their respective terminals or portals. Users 130 can be any type of end user or customer of users 120 or users 110, such as end user A or customers B and C, or the end user purchasing and/or receiving the telecommunications network related services of users 110 or users 120. Each of users 130 can communicate with servers 100 via their respective terminals or portals.

Still referring to FIG. 1, central servers 100 of the marketplace platform system according to one or more embodiments can be in further bi-directional communication with admin terminal/dashboard 140. Here, admin terminal/dashboard 140 can provide various tools to any of users 110, 120, and 130, or a sales team or a content/product creation team to manage various customers/end users and customer leads, wherein such managing can include, among others, creating, editing, and promoting various types of telecommunications network services or product sales promotional campaigns, advertising, offerings, and ordering options for customers and other users of the marketplace platform according to one or more embodiments. In addition, admin terminal/dashboard 140 may also include various types of access privileges to different users of the marketplace platform system according to one or more embodiments. Further, central servers 100 according to one or more embodiments can be in further bi-directional communication with database/third party servers 150. Here, servers 150 can provide various types of data storage (such as cloud-based storage), web services, content creation tools, data streams, data feeds, and/or provide various types of third-party support services to central servers 100 of the marketplace platform. However, it is contemplated within the scope of the present disclosure described herein that the network services marketplace platform process and system according to one or more embodiments can include any type of general network architecture.

Still referring to FIG. 1, one or more servers or terminals of elements 100-150 may include a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers, terminals, and users 100-150 may include a set of components, such as a processor, a memory, a storage component, an input component, an output component, a communication interface, and a JSON UI rendering component. The set of components of the device may be communicatively coupled via a bus.

The bus may comprise one or more components that permit communication among the set of components of one or more of servers or terminals of elements 100-150. For example, the bus may be a communication bus, a cross-over bar, a network, or the like. The bus may be implemented using single or multiple (two or more) connections between the set of components of one or more of servers or terminals of elements 100-150. The disclosure is not limited in this regard.

One or more servers or terminals of elements 100-150 may comprise one or more processors. The one or more processors may be implemented in hardware, firmware, and/or a combination of hardware and software. For example, the one or more processors may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operation of one or more of servers or terminals of elements 100-150 and/or of the set of components of one or more of servers or terminals of elements 100-150 (e.g., memory, storage component, input component, output component, communication interface, rendering component).

One or more of servers or terminals of elements 100-150 may further comprise memory. In some embodiments, the memory may comprise a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers or terminals of elements 100-150 may store information and/or computer-readable instructions and/or code related to the operation and use of one or more of servers or terminals of elements 100-150. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers or terminals of elements 100-150 may further comprise an input component. The input component may include one or more components that permit one or more of servers and terminals 110-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component any one or more of servers or terminals of elements 100-150 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers or terminals of elements 100-150 may further comprise a communication interface. The communication interface may include a receiver component, a transmitter component, and/or a transceiver component. The communication interface may enable one or more of servers or terminals of elements 100-150 to establish connections and/or transfer communications with other devices (e.g., a server, another device). The communications may be enabled via a wired connection, a wireless connection, or a combination of wired and wireless connections. The communication interface may permit one or more of servers or terminals of elements 100-150 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as FlashLinQ, WiMedia, Bluetooth, ZigBee, Wi-Fi, LTE, 5G, and the like. In other embodiments, the communication interface may include an Ethernet interface, an optical interface, a coaxial interface, an infrared interface, a radio frequency (RF) interface, or the like.

Figure 2:
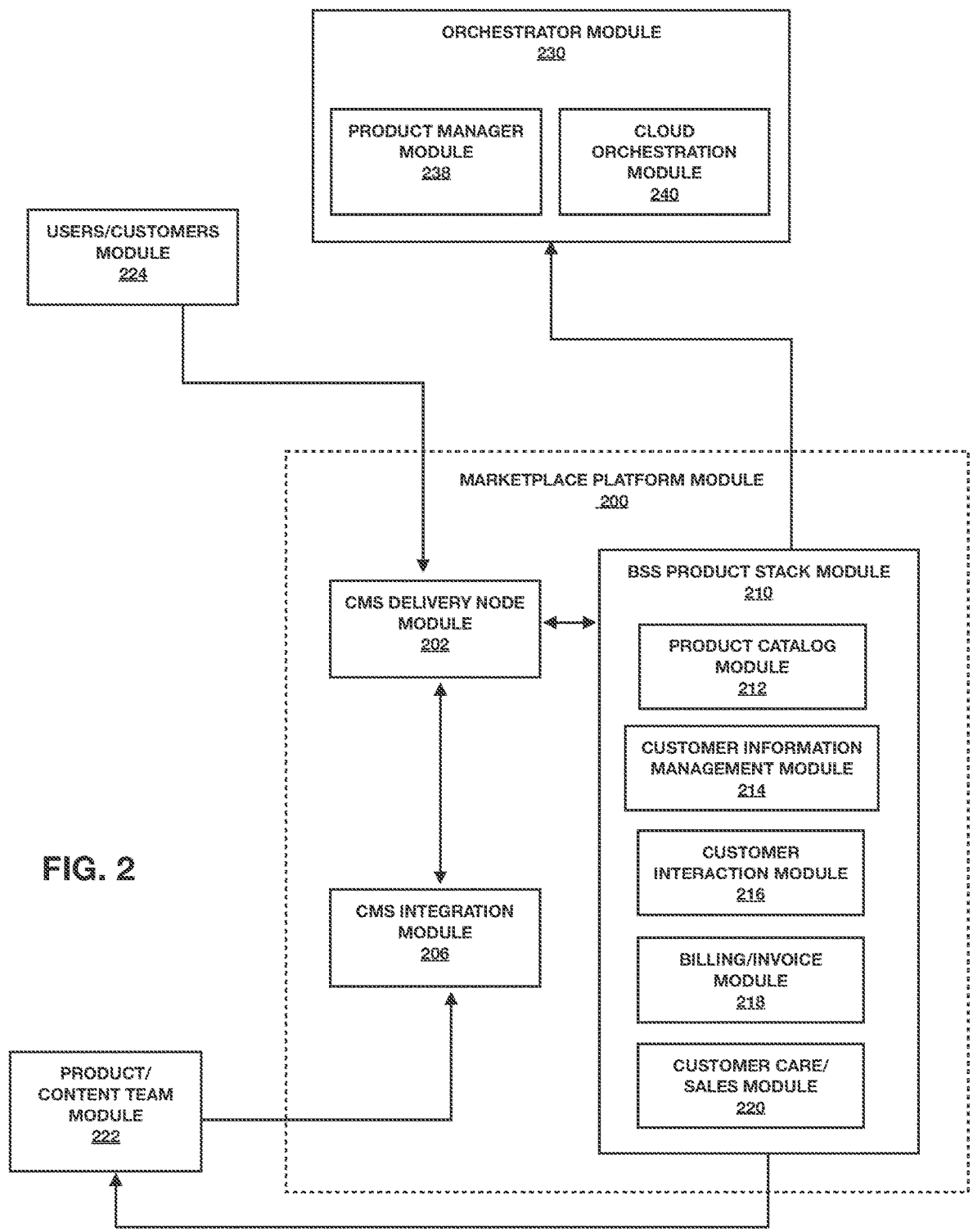
FIG. 2 illustrates a block diagram of a system for providing a marketplace platform according to one or more embodiments.

FIG. 2 illustrates a telecommunications network services marketplace and trading platform system according to one or more embodiments. Referring to FIG. 2, marketplace platform module or portal 200 can include a Customer Management System (CMS) delivery node module 202 which can be a portal for the marketplace platform and is in bidirectional communication with a Business Support Systems (BSS) product stack module or portal 210 (including any one or more of modules 212-220 illustrated in FIG. 2), and a CMS integration module or portal 206 for content management and integrating with various repositories. Users/customers module or portal 224 (e.g., a user terminal or client device) can access the marketplace via communication with CMS delivery node module or portal 202. In some embodiments, users/customers module or portal 224 can also be in communication with a Content Distribution Network (CDN) module or portal which is further in communication with modules or portals 202 and 206. In some embodiments, the CMS delivery node module or portal 202 can address a first customer interaction when the customer accesses the marketplace platform 200 according to one or more embodiments. For example, the CMS delivery node module or portal 202 can receive a request from a user terminal or portal 224 of the customer to view the available products/services, retrieve product/service data from a product catalog, and generate/present a user interface graphical representation (e.g., column, list, etc.) illustrating available products/services of the marketplace platform or of one or more service providers or vendors. In addition, a product/content team module or portal 222 (e.g., a terminal or client devices of a seller, service provider, vendor, etc.) may also be in communication with the marketplace platform module or portal via communication with the CMS integration module or portal 206. In this case, the CMS integration module or portal 206 can generate and/or present graphical user interfaces relevant to a seller, service provider, vendor, etc. (e.g., user interfaces for listing products for sale, configuring sales listings, generating or editing customer or product configuration profiles, promoting sales activity, etc.).

Still referring to FIG. 2, the marketplace platform module or portal 200 according to one or more embodiments may also include the BSS product stack module or portal 210. Here, module 210 may further include a product catalog module or portal 212 which can be a repository/data storage for storing product/service data. Further, module 212 may also include and store product/service level promotional offers or price reduction indicators or events associated with one or more stored products/services. Module 210 may also include a customer information management (CIM) module or portal 214 which can be a repository/data storage for storing customer information (e.g., name, contact information, ID, customer interest list, customer level promotional offers or price reduction events, etc.). Module 210 may also include a customer interaction management module or portal 216 which can be a repository/data storage for storing information of the customer's interaction with the marketplace platform according to one or more embodiments (e.g., the interaction history of the customer with the interactive elements of the graphical user interface (GUI), communications between the customer and the service provider(s) or other customer(s), etc.)

Still referring to FIG. 2, module 210 can also include a billing/invoice module or portal 218 for storing information associated with the customer's billing/invoicing on a service provided in the marketplace platform (e.g., previously created invoice, billing history, etc.). In addition, module 210 may also include a customer care/sales module or portal 220 for storing information of the sales or customer related activities (e.g., sales campaign history, promotion activities for a specific type of customer, historical sales analysis, etc.). In some embodiments, module 220 can identify data associated with sales activity and user's experiences, retrieve/collect the data from external data storages or from any of modules or portals 212-218, store such data in a repository included in module 220, and provide such data to the network service provider/vendor when required. As shown, module 220 can also be in communication with the product/content team module or portal 222. Here, the product/content team module or portal 222 can be users or a portal for users (e.g., vendors/service providers) who want to promote/sell network services. In addition, product/content team module or portal 222 can be a lead converter system or users who want to convert customer leads, analyze customer activity, and promote pre-sales and post-sales activities and marketing campaigns.

Still referring to FIG. 2, the marketplace platform module or portal 200 may also be in communication with an orchestrator module 230 (e.g., via an Application Programming Interface (API)). In particular, any one or more of modules or portals 212-220 of module 210 may be in communication with and/or supported by any of modules or portals 238-240 of module 230. Specifically, orchestrator module 230 can include a product/service management module 238 and a cloud orchestration module 240. In particular, any of modules 238-240 can be containerized and stored in a "cloud" or within cloud clusters on external servers and databases. In some embodiments, product/service management module 238 comprises a repository/data storage for storing products and services provided by a vendor/service provider. In some embodiments, the products and services are virtualized or are software-based. In some embodiments, the cloud orchestration module 240 is configured to schedule and provide the products and services to a user of the network services marketplace platform.

Figure 3:
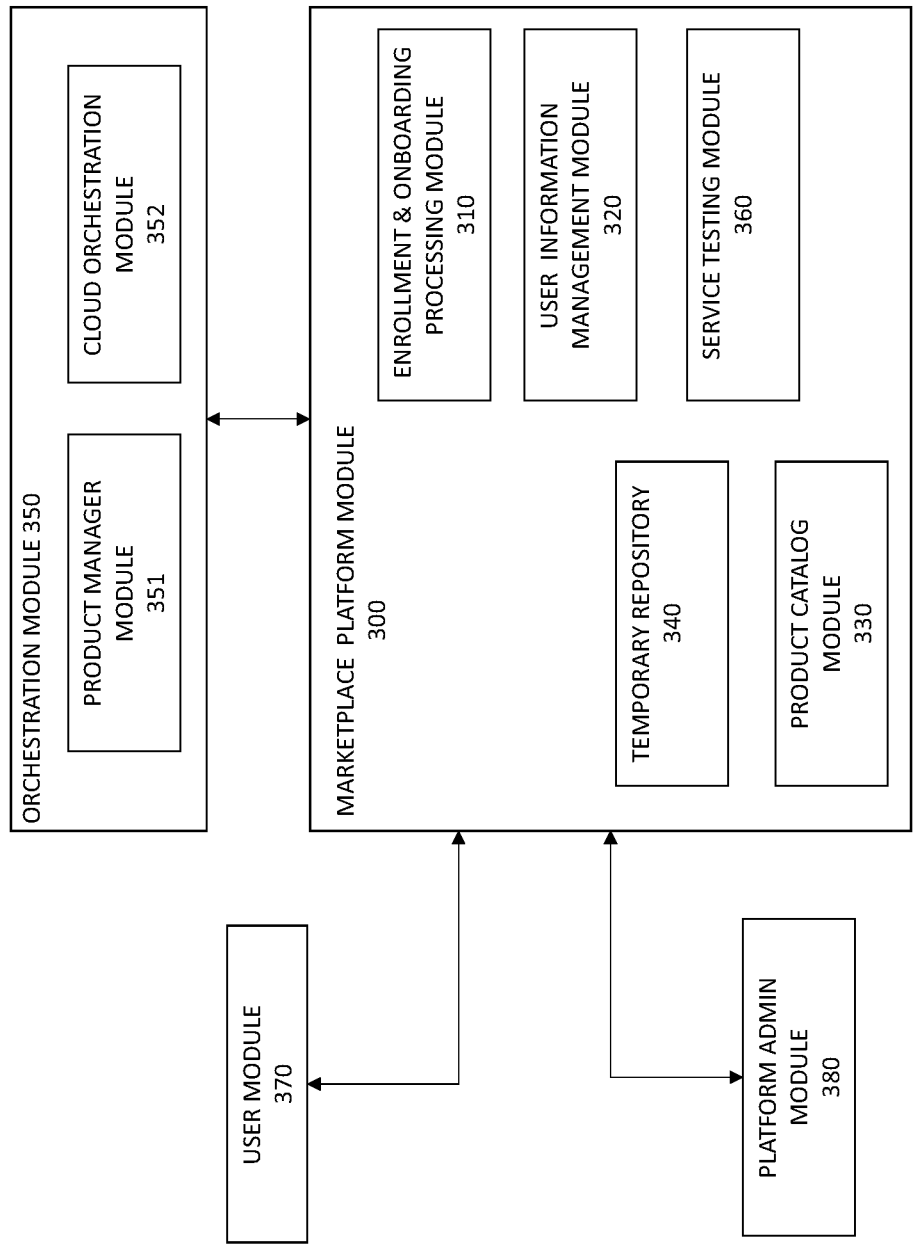
FIG. 3 illustrates a block diagram of a system for enrolling service providers and onboarding virtualized network services according to one or more embodiments.

FIG. 3 illustrates a block diagram of a system for enrolling service providers and onboarding virtualized network services according to one or more embodiments. Referring to FIG. 3, an orchestration module 350 may include a product manager module 351 and a cloud orchestration module 352 similar to the product manager module 238 and a cloud orchestration module 240 in FIG. 2. Moreover, referring to FIG. 3, the marketplace platform module 300 may include an enrollment and onboarding processing (EOP) module 310, a user information management (UIM) module 320, a product catalog module 340 (i.e., similar to the product catalog module 214 in FIG. 2), a temporary repository 340 and a service testing module 360.

In FIG. 3, a user module 370 (similar to the users/customers module 224) and a platform administration module 380 (similar to a product/content team module 222) can communicate with the marketplace platform module 300. The communication between the user module 370 and a platform administration module 380 to the marketplace platform module 300, for example, is similar to the communication between the users/customers module 224, the product content team module 222 in the marketplace platform 200 of FIG. 2.

Still referring to FIG. 3, the EOP module 310 can be a portal for the marketplace platform 300 and is in bidirectional communication with UIM module 320, the temporary repository 340, the product catalog module 330, the orchestration module 350, the service test module 360 portal 210, the user module 370 and the platform administration module 380.

In FIG. 3, the temporary repository 340 is a data repository that can store software applications such as network service software applications, etc., to be on boarded to marketplace platform 300. The service testing module 360 can be a system emulator for virtualizing the telecommunication infrastructure of a network operator to provide a safe test environment (i.e., a test environment segregated from the existing telecommunication infrastructure of a network operator) for a review/testing team to test products (e.g., network service) to be on boarded to the centralized marketplace.

In FIG. 3, it is contemplated within the scope of the present disclosure described herein that any user of the marketplace platform can first log in to the EOP module 310 to determine the type or role of the user (e.g., a service provider on the seller's side of the marketplace or a network operator on the buyer's side of the marketplace) or the access privileges of that user (i.e., user privileges of a service provider and platform administrator privileges of a network operator), such as the appropriate users for modules or portals 222, 224.

Figure 4:
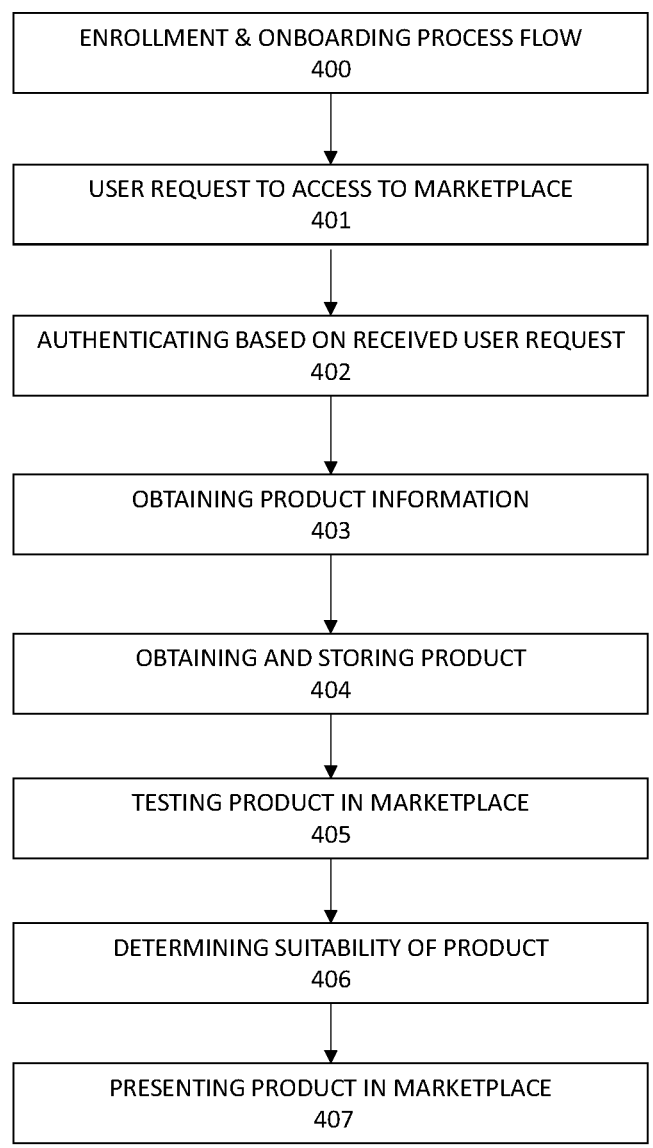
FIG. 4 illustrates a flowchart of a method for enrolling service providers and onboarding products (e.g., network services) to a marketplace platform according to one or more embodiments.

FIG. 4 illustrates a flowchart of a method 400 for enrolling service providers and onboarding products (e.g., network services) to a marketplace platform according to one or more embodiments. Referring to FIG. 4, in step 401, the EOP module 310 generates and presents a graphical user interface (GUI) to prompt a user (e.g., service provider, network operators, customers, etc.) to log in to the marketplace, based on a centralized login policy defined by a second user (e.g., a network operator, administrator, etc.). In an example embodiment, the EOP module 310 can generate and present a GUI to allow the second user (e.g., a network operator, administrator, etc.) to obtain the user profile information of the first user (e.g., a service provider, customer), based on a centralized login policy defined by the second user (e.g., a network operator, administrator, etc.). The centralized login policy is a process to enroll users (e.g., service provider, customers, etc.) to the centralized marketplace (e.g., to the marketplace platform 300) defined by the second user (e.g., a network operator, administrator, etc.) based on a centralized standard/format of user profile information for first users (e.g., e.g., service provider, customers, etc.) of the centralized marketplace.

In step 402, the EOP module 310 generates and presents a GUI to prompt a first user (e.g., a service provider) to provide product information of the first user's product (e.g., a virtualized network service) based on a centralized onboarding policy defined by the second user (e.g., a network operator). In an example embodiment, the EOP module 310 can generate and present a GUI to allow the second user (e.g., a network operator) to obtain product information of a first user's product based on a centralized onboarding policy defined by the second user. The centralized onboarding policy is a process to onboard (e.g., launch or offer) new products (e.g., network services) to the centralized marketplace (e.g., to the marketplace platform 300) defined by the second user (e.g., a network operator) for all users (e.g., service providers, customers, sellers) of the marketplace.

In step 403, the EOP module 310 generates and presents a GUI to prompt a first user (e.g., a service provider) to upload the product to the centralized marketplace. In an example embodiment, the EOP module 310 can generate and present a GUI to allow the second user (e.g., a network operator) to obtain the product and product information of the first user's product.

In step 404, the EOP module 310 connects to a temporary repository 340 to store the product in the centralized marketplace.

In step 405, the EOP module 310 generates and presents a GUI to prompt a second user (e.g., a network operator) to test the product in a test environment (e.g., a service testing module 360). In an example embodiment, the EOP module 310 can generate and present a GUI to prompt a review/testing team to subject the product to an onboarding test in the service testing module 360 of the marketplace platform 300.

In step 406, the EOP module 310 generates and presents a GUI to prompt a second user (e.g., a network operator) to evaluate the product based on the onboarding test in the central marketplace. In an example embodiment, the EOP module 310 can generate and present a GUI to allow a review/testing team to, for example, execute tests on the product or review test results based on the centralized onboarding policy.

In step 407, the EOP module 310 generates and presents a GUI that may allow the second user (e.g., a network operator) to determine the suitability of the product based on the centralized onboarding policy. In an example embodiment, the EOP module 310 can generate and present a GUI that allows the second user (e.g., a network operator) to present information about the evaluation of the onboarding test in step 407 to the first user (e.g., the service provider).

In an example embodiment, in step 407, the EOP module 310 generates and presents a GUI that allows the second user (e.g., a network operator) to manage and control the role of a first user (e.g., the service provider) in the evaluation of the product during the onboarding test. In an example embodiment, the EOP module 310 can generate and present a GUI that may allow the second user (e.g., a network operator) to query information or adjustments to the first user's product (e.g., the network service of a service provider) to continue the evaluation in step 406 so that the second user determines the suitability of the first user's product.

In step 407, based on the evaluation and determination as set forth above, the product to be on boarded to the centralized marketplace may be suitable for the second user (e.g., the network operator). In this case, EOP module 310 requests the temporary repository 340 to transfer the first user's product (e.g., the network service of a service provider) to the product manager module 351. In an example embodiment, the product manager module 351 may present the first user's product to at least one second user (e.g., at least one network operator) in the centralized marketplace (e.g., marketplace platform 300).

Still referring to step 407, in an example embodiment, the cloud orchestration module 352 may release (e.g., transfer) the product information to the product catalog module 330 of the marketplace platform 300. In an example embodiment, the orchestration module 340 may present or provide a schedule for a release (e.g., transfer to the product catalog module 330) of the product (e.g., network service) in the centralized marketplace (e.g., marketplace platform 300).

Figure 5A:
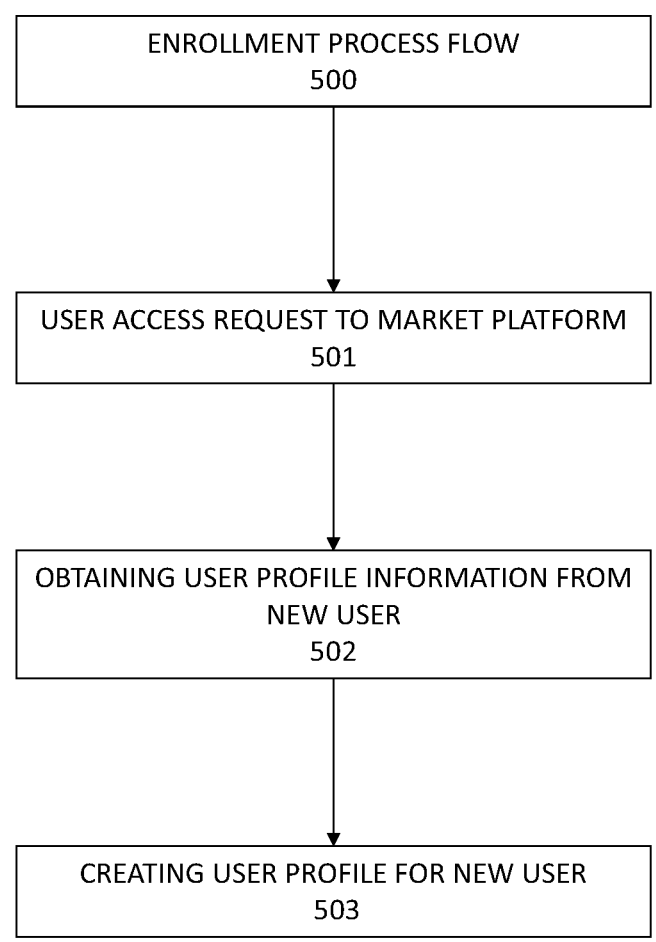
FIG. 5A illustrates a flowchart of a method for enrolling service providers to a marketplace platform according to one or more embodiments.

FIG. 5A illustrates a flowchart of a method for enrolling service providers 500 to a centralized marketplace according to one or more embodiments. Referring to FIG. 5A, to access the marketplace platform 300 any user (e.g., service provider, customer, seller, network operator, administrator, etc.) of the marketplace must be enrolled (e.g., a registered user). To this end, in step 501, the EOP module 310 detects an unregistered user (e.g., a not logged-in first user such as service provider or a customer). In the case of an unregistered user, the EOP module 310 generates and presents an interactive element for the user. In an example embodiment, a first user (e.g., service provider or customer) can trigger an access request by the interactive element. For example, the first user can trigger an access request by an associated interactive element (e.g., a "login" button, a "create account" button, etc.) on a registration GUI, such as selecting a login page, for the marketplace platform 300.

In step 502, upon the receipt of the access request of a new (i.e., unregistered) user, the EOP module 310 requests activation information that allows (e.g., guides) the unregistered user to input user' credentials. Based on the user's input, the EOP module 310 verifies the user's credentials. For example, the EOP module 310 verifies the unregistered user' credentials by means of a verification by email.

I step 503, once the activation information were verified, the EOP module 310 creates a user (e.g., service provider) profile. To this end, the EOP module 310 may request the UIM model 320 to provide a user profile template. The EOP module 310 generates a user profile GUI and presents the user profile GUI to allow (e.g., guide) the user to input its user profile information. In an example embodiment, the EOP module 310 may create a user profile dashboard (e.g., service provider dashboard) based on the obtained user profile information. To this end, the EOP module 310 may process the user's profile information in a standardized format for the marketplace platform 300.

Still referring to step 503, the EOP module 310 connects to the platform administrator module 380 to request a platform administrator to review and approve the user (e.g., service provider) profile dashboard information. Based on the platform administrator's successful review and approval, the EOP module 310 may receive an approval notice from the platform administrator module 380. In an example embodiment, the EOP module 310 may create a notification about the successful user enrollment to the user and, based on the successful user enrollment, provides a user status notification to update the associated user's information in the UIM module 320.

FIG. 5B illustrates a flowchart of a method 510 for a guided enrollment of service providers to a centralized marketplace according to one or more embodiments. Referring to FIG. 5B, a user (e.g., service provider) accesses the marketplace platform 300. In step 511, the EOP module 310 detects that the user is not logged in (e.g., an unregistered user) to the marketplace platform 300. In an example embodiment, the EOP module 310 generates and presents an interactive element (e.g., a "login" button, a "create account" button, etc.) for the user such that the user (e.g., service provider) can select to log in to the marketplace 200, 300. In an example embodiment, in the case of a registered user (e.g., service provider), the user can select the log-in button. In step 512, the user can then provide his log-in data such as user name, user ID, e-mail address, password, ticket number, etc. in order to log in, for example, via a GUI (e.g., login GUI) subsequently generated and presented by the EOP module 310. Once the login credentials are successfully verified, the user is logged on to the marketplace 300.

Still referring to step 512, in the case of an unregistered user (e.g., service provider), the EOP module 310 generates and presents an interactive element (e.g., a "create account" button, etc.) to the new (e.g., unregistered) user. The new user can select the create account button, which may trigger an access request by the interactive element. The EOP module 310 detects the access request of the new (e.g., unregistered).

In step 513, in an example embodiment, the EOP module 310 requests either a login template for the registered user or a sign-up template for the unregistered user from the UIM module 320. The login (e.g., sign-up) template, for example, may include user activation information such as user name, user ID, e-mail address, password, ticket number, an authentication request to an identity platform, etc.

In step 514, in an example embodiment, the EOP module 310 obtains the login (e.g., sign-up) template from the UIM module 320. Based on the login (e.g., sign-up) template, the EOP module 310 generates and presents a user activation information GUI, for example, a login (e.g., sign-up) information GUI. The GUI may include multiple input fields to request user activation information decided by the network operator in a guided manner, for example, pre-filled input field, pull-down menus or auto-fill out functions that allow (e.g., guides) the user to directly input the requested information in the required fields. To this end, the network operator can obtain a common standard/format for all new users (e.g., service providers).

In step 516, the EOP module 310 presents the GUI to the new user and requests the user to input its' user activation information. In an example embodiment, the EOP module 310 checks the user input. If the user input does not conform to the standard/format defined by the network operator, the EOP module responds either with a notification (e.g., creating and providing an additional graphical user interface) to prompt the user to revise the user information to conform to the required standard/format in step 516A, or with an auto-correction of the input information according to the required standard/format in step 516B. By repeating steps 516, 516A, and 516B, the input information is subjected to a standardization process.

In step 517, the EOP module 310 verifies the standardized input information. For example, in an example embodiment, the EOP module can initiate an email verification process. Specifically, for this example, the EOP module requests a verification email template from the UIM module 310. Based on the received verification email template, the EOP module 310 can generate a verification email that includes the standardized user information received in step 516 and can send the verification email to the new user (e.g., unregistered user). In this way, the validity of the email can be verified. The verification in step 517 completes the collection of user activation information in FIG. 5B.

FIG. 6 illustrates a flowchart of a method 600 for creating a user profile and dashboard for a centralized marketplace according to one or more embodiments. Referring to FIG. 6, In an example embodiment, the success verification in step 517 relates to a first log-in of a new user (e.g., an unregistered user without a user profile) to the marketplace platform 300. In this case, the user's activation information has been verified and the EOP module 310 sends a notification to the new user. In an example embodiment, the EOP module 310 can generate a confirmation GUI in form of a welcome page for the new user.

In step 601, in the case of the above example embodiment (i.e., an unregistered user without a user profile), the EOP module 310 requests a user profile (e.g., service provider profile) template from the UIM module 320. In step 603, the UIM module 320 provides the user profile template.

In step 603, the EOP module 310 generates a service provider profile GUI based on the user profile template.

In step 604, the EOP module presents the graphical user interface to the new user (e.g., new service provider) and prompts the user for its profile information. For example, the graphical user interface may include multiple input fields for requesting user profile information that is determined by the network operator in a guided manner, such as pre-filled input fields, pull-down menus, or auto-complete functions that allow (e.g., guide) the user to enter the requested information directly into the required fields. To this end, the network operator maintains a common standard or format for all new users (e.g., service providers) in the marketplace platform 300.

Still referring to step 603, the user profile GUI may include all types of business-related information defined by the network operator. In an example embodiment, the EOP module 310 can generate at least one graphical user interface, which may take the form of a multi-level (e.g., multi-step) wizard comprising a sequence of graphical user interfaces that may include multiple interactive pages (e.g., graphical user interfaces prompting for input information) for a variety of information categories. In this way, user profile information queries are structured intuitively and efficiently. For example, the categories for the querying of the user profile information may include: vendor information, sales/pricing information/, product information (e.g., virtualized network services information), customer service information, etc.

In step 603, when the EOP module 310 determines the completion of entering the user profile information, the EOP module 310 stores the user profile information in the UIM module 302.

At step 604, the EOP module 310 sends a notification informing the marketplace platform administrator (e.g., a content/product team) that a new user profile (e.g., a new service provider profile) has been created and requires approval.

In step 605, the platform administrator accesses the marketplace platform 300 via the platform administration module 380. In an example embodiment, the EOP module 310 can generate a user profile dashboard from the user (e.g., service provider) profile information to present it to the platform administrator. In an example embodiment, the user (e.g., service provider) profile information dashboard may be reviewed based on user profile information stored in the UIM module 320 or based on updated user profile information stored in the UIM module 320.

In an example embodiment, in step 605, the platform administration can review the user profile dashboard information and, if it meets the standard/format requirements defined by the network operator, the platform administration can approve the user profile dashboard information. In an example embodiment, the patent platform administrator may review and approve either user profile information entered directly by the new user or user profile information edited by the EOP module 310 (e.g., user profile dashboard information). In an example embodiment, the patent platform administrator may review and approve user profile information stored in the UIM module 320.

Still referring to step 605, in an example embodiment, the EOP module 310 may generate and present an interactive element for the user profile information approval (e.g., by clicking an "approve" button in a graphical user interface, etc.) or a graphical user interface to check the approval status of the user profile information, etc. In an example embodiment, in case the platform administration cannot approve the user profile dashboard information, steps 603 to 605 may be interactively repeated based on the user profile information GUI presented by the EPO module 310 until an approvable set of user profile information could be collected.

In step 606, based on the approval of the platform administration, the EOP module 310 connects to the UIM module 320 to update the status of the user information to the associated user's information in the UIM module 310. For example, the update states may include an information element such as "under review", "successfully enrolled", etc. In an example embodiment, step 606 may finalize the enrollment flow of method 600 in FIG. 6.

Figure 7:
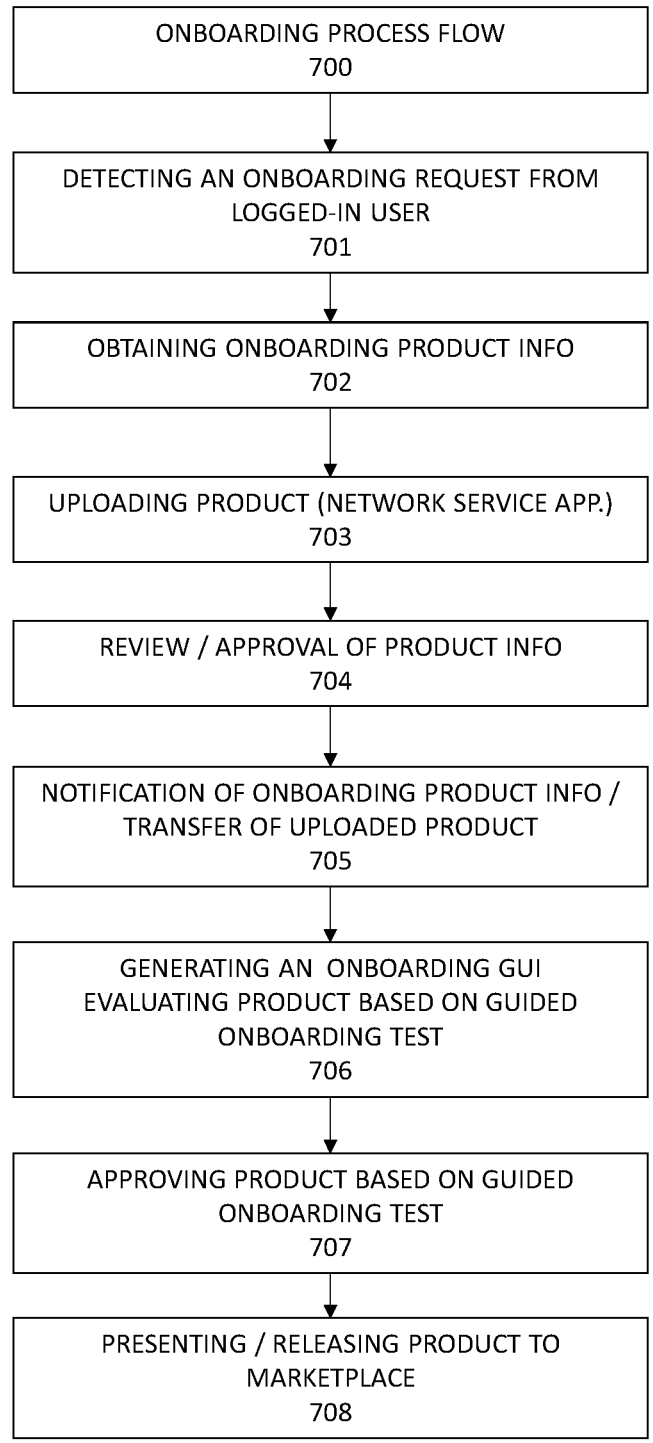
FIG. 7 illustrates a flowchart of a method for onboarding of network services to a marketplace platform according to one or more embodiments.

FIG. 7 illustrates a flowchart of a method 700 for onboarding network services to a marketplace platform according to one or more embodiments. Referring to FIG. 7, only a logged-in user to the marketplace platform 300 (e.g., a registered user) can request the onboarding of a product (e.g., a virtualized network service). To this end, the user (e.g., the service provider) must successfully log in to the marketplace portal (300) (e.g., complete registration) to request the onboarding of a product (e.g., a virtualized network service) to the marketplace platform (200, 300).

Based on the successful enrollment of a user (e.g., a service provider), the user can log in to the marketplace platform 300 and select an onboarding page to supplement products (e.g., virtualized network services) to the marketplace platform 300 by requesting an onboarding of a product (e.g., a virtualized network service). In an example embodiments, to this end, the EOP module 310 generates and presents an onboarding page to new or existing users (e.g., new or existing service providers) in form of a GUI on a landing page, etc.

In step 701, the EOP module 310 detects an onboarding request of a user via the marketplace platform 300.

In step 702, the EOP module 310 requests template(s) for product information from the UIM module 320. Based on the template(s), the EOP module 310 generates and presents GUI(s) for requesting product information (e.g., network service information) to allow (e.g., guide) a user (e.g., service provider) to enter product information (e.g., a network service information) for the product to be on boarded onto the marketplace platform 300.

In step 703, the EOP module 310 determines the completion of entering the product information from the user. The EOP module 310 requests the UIM module for a template to generate and present a GUI to prompt (e.g., guide) the user to upload the product (e.g., network service) to the temporary repository 340 in the marketplace platform 300. In an example embodiment, the upload GUI may include input fields to prompt the user to input additional user information to the upload GUI.

In step 704, in an example embodiment, the EOP module 310 can collect the remaining product information (e.g., product information that may have been additionally uploaded with the product) and determines the completion of the product information entry. Accordingly, the EOP module 310 connects to a platform administrator for requesting a review and approval of the product information. In an example embodiment, the review and approval process may be similar to the review and approval process in steps 603 to 605 of FIG. 6 (e.g., step 503 of FIG. 5A).

In step 705, in an example embodiment, the review of the platform administrator may result in approval of the product information. According to this embodiment, the EOP module 310 connects to a review/testing team. In an example embodiment, the EOP module 310 may notify the review/testing team about the creation of new onboarding product information for an uploaded product (e.g., uploaded network service). The EOP module 310 can transfer the uploaded product to the review/testing team for further evaluation of the product based on a guided onboarding test.

In step 706, the EOP module 310 generates onboarding test GUI(s) based on the onboarding test templates of the UIM module 320 and presents the information received from the review/testing team to the user (e.g., service provider) via said onboarding test GUI(s).

Still referring to step 706, in an example embodiment, the review/testing team approves or rejects the network service based on test results from the onboarding test of the uploaded product.

In step 707, once the review/testing team can approve the network service, the EOP module 310 requests the temporary repository 340 to transfer the network service to the product manager module 351.

In step 708, the cloud orchestration module 352 releases the network service to the marketplace platform 300. In an example embodiment, the cloud orchestration module 352 may schedule the release of the product (e.g., network service) in the marketplace platform 300. For instance, the cloud orchestration module 352 may transfer the product information record (e.g., descriptions, version number, price, etc.) to the product catalog module 330. The product catalog module 330 publishes the product information record (e.g., product information dashboard) as an available product to all and/or selected customers/users in the marketplace platform 300.

Figure 8:
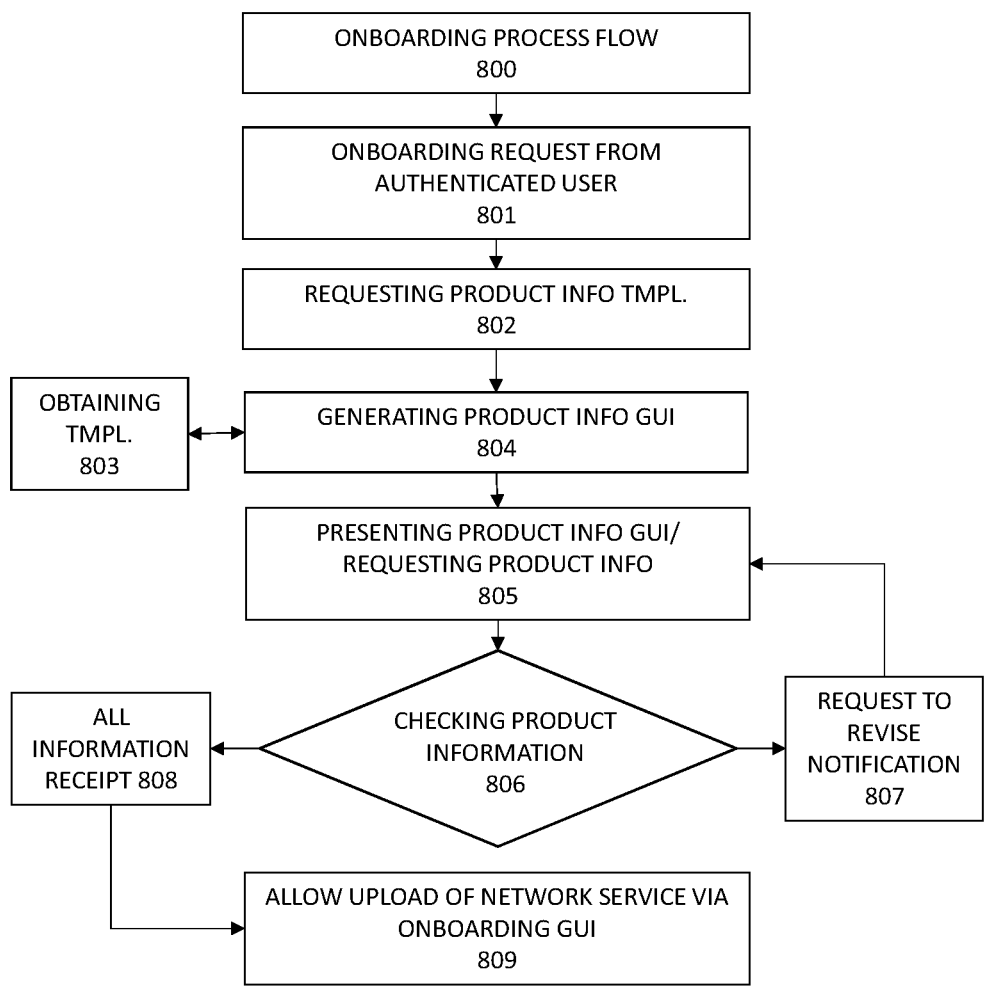
FIG. 8 illustrates a flowchart of a method for a guided onboarding of network services to a marketplace platform according to one or more embodiments.

FIG. 8 illustrates a flowchart of a method 800 for a guided onboarding of network services to a marketplace platform according to one or more embodiments. Referring to FIG. 8, in step 801, according to one or more example embodiments, a user (e.g., service provider) may on board a network service to the marketplace platform 300 via an onboarding page, a landing page, a user profile dashboard, etc. The onboarding page, landing page, user profile dashboard, etc. may include an associated interactive element (e.g., "add service" button, etc.). For instance, in the case of a user who already launched (e.g., on-boarded) a product at the marketplace platform 300, the EOP module 310 can generate and present a GUI (e.g., user profile dashboard, etc.) which may include an associated interactive element (e.g., an "add service" button, etc.). In an example embodiment, when a user (e.g., service provider) wants to onboard a product (e.g., a virtualized network service) for the first time, the user can select the associated interactive element on an onboarding page that triggers a request for onboarding of a product (e.g., a virtualized network service) after the user has logged in to the marketplace platform 300.

Not limited to the example embodiments, the user triggers an associated interactive element (e.g., an "add service" button, etc.) presented by the EOP module 310 after the user has logged in to the marketplace platform 300.

In step 802, the EOP module 310 requests product information (e.g., network service information) template from the UIM module 320.

In step 803, the UIM module 320 provides a product information (e.g., network service information) template.

In step 804, the EOP module 310 generates a product information GUI (e.g., a network service information GUI). The product information GUI may include all types of product-related information defined by the network operator. In an example embodiment, the EOP module 310 can generate at least one graphical user interface, which may take the form of a multi-level (e.g., multi-step) wizard comprising a sequence of graphical user interfaces that may include multiple interactive pages for a variety of information categories. In this way, product information (e.g., network service information) queries are structured intuitively and efficiently. For example, the categories for the querying of the product information (e.g., network service information) may include technical specification, test specification, implementation specification, user manuals, performance specification, compatibility information, release status information, sales/pricing information, customer service information, etc.

In step 805, the EOP module 310 presents the graphical user interface to the user (e.g., new service provider). In an example embodiment, the graphical user interface may include multiple input fields for requesting user profile information that is determined by the network operator in a guided manner, such as pre-filled input fields, pull-down menus, or auto-complete functions that allow (e.g., guide) the user to enter the requested information directly into the required fields. To this end, the network operator maintains a common standard or format for all new users (e.g., service providers) in the marketplace 200, 300.

In step 806, the EOP module 310 presents the GUI to the user and request the user to input its' product information (e.g., network services information). In an example embodiment, The EOP module 310 can check the user input.

In step 807, if the user input does not conform to the standard/format defined by the network operator, the EOP module responds either with a notification (e.g., creating and providing an additional graphical user interface) to prompt the user to revise the product information (e.g., network services information) to conform to the required standard/format or with an auto-correction of the input information according to the required standard/format. By repeating steps 806 and 807 the input information is subjected to a standardization process.

In step 808, when the EOP module 310 determines the completion of entering the product information (e.g., network services information), when the EOP module 310 stores the recorded product information (e.g., network services information) in the UIM module 302. In an example embodiment, the EOP module 310 may create a product information dashboard.

In step 809, the EOP module 310 allows the user to upload of the product (e.g., network service) to the temporary repository 340. In an example embodiment, the EOP module 310 may verify the recorded product information (e.g., network services information) similar to step 517 in FIG. 5 before allowing the user to upload of the product in step 809.

Figure 9:
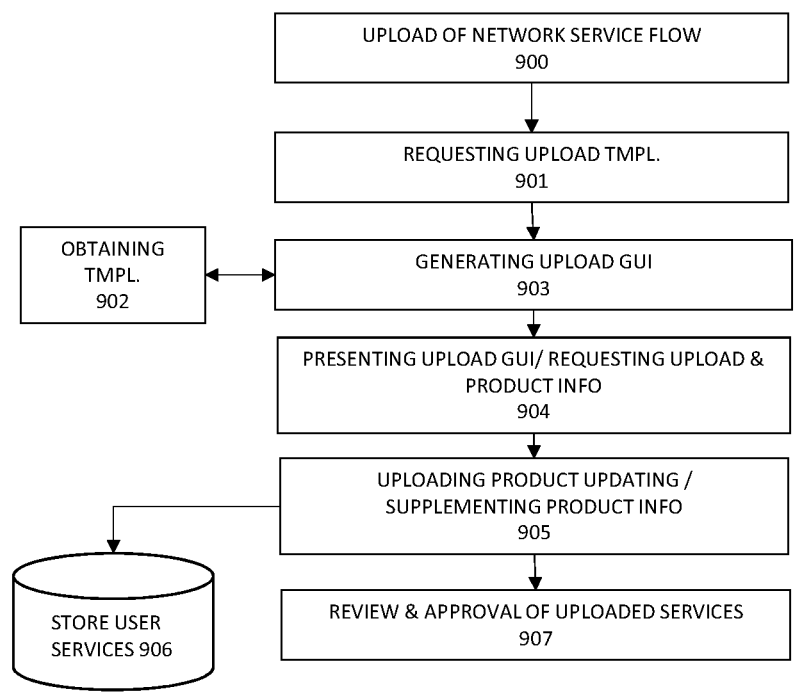
FIG. 9 illustrates a flowchart of a method for guided uploading of network services to a marketplace platform according to one or more embodiments.

FIG. 9 illustrates a flowchart of a method 900 for guided uploading of network services to a marketplace platform according to one or more embodiments. Referring to FIG. 9, in an example embodiment, the user is logged in to the marketplace platform 220, 300 and has successfully completed the entry of product information (e.g., network service information).

In step 901, the EOP module 310 requests the UIM module 320 for a template to generate and present an up-load GUI.

In step 902, the EOP module 310 obtains the product up-load template from the UIM module 320.

In step 903, the EOP module 310 generates an up-load GUI to allow (e.g., guide) the user to upload the product (e.g., network service) to the temporary repository 340 in the marketplace platform 300. In an example embodiment, the up-load GUI may request the user to input additional product information (e.g., network service information).

In step 904, the EOP module 310 presents the up-load GUI to the user (e.g., new service provider) and prompt for an up-load of the product (e.g., network service) to the temporary repository 340. In an example embodiment, the graphical user interface may include multiple input fields for requesting user profile information and/or product information that is determined by the network operator in a guided manner, such as pre-filled input fields, pull-down menus, or auto-complete functions that allow (e.g., guide) the user to enter the requested information directly into the required fields. Moreover, in an example embodiment, the prompt for an up-load of the product (e.g., network service) to the temporary repository 340 may include a drag-and-drop field. To this end, the network operator maintains a common standard or format for onboarding (e.g., uploading of a product) for all new users (e.g., service providers) in the marketplace 200, 300.

In step 905, the user uploads the product (e.g., network service) to the temporary repository 340 in the marketplace platform 300. In an example embodiment, the input of information to the up-load GUI may be similar to steps 806 and 807 in FIG. 8.

Still referring to step 905, in an example embodiment, the EOP module 310 can supplement the recorded product information of step 808 in FIG. 8 with the collected product information (e.g., network service information) in step 904.

In an example embodiment, the EOP module 310 can store the product information in the UIM module 3202.

In step 906, the EPO module 310 connects to the temporary repository 340 to store the product (e.g., network service) on the temporary repository 340 for further processing (e.g., testing the network service in the service testing module 360).

In step 907, when the EOP module 310 determines the completion of entering the product information and the completion of the upload of the product (e.g., network service), the EOP module 310 may send a notification informing the marketplace platform administrator (e.g., a content/product team) that the entering of product information and the upload of the product (e.g., network service) has been completed and requires approval.

Still referring to step 907, when the platform administrator accesses the marketplace platform 300 via the platform administration module 380. In an example embodiment, the EOP module 310 can generate a dashboard from the product information and the upload information of the product (e.g., network service). In an example embodiment, the review/approval process of the platform administrator is similar to step 705 in FIG. 7 (i.e., steps 604 and 605 in FIG. 6). In an example embodiment, based on the platform administrator's approval of the EOP module 310 may transfer the product information to a testing engineer of the review/testing team.

Figure 10:
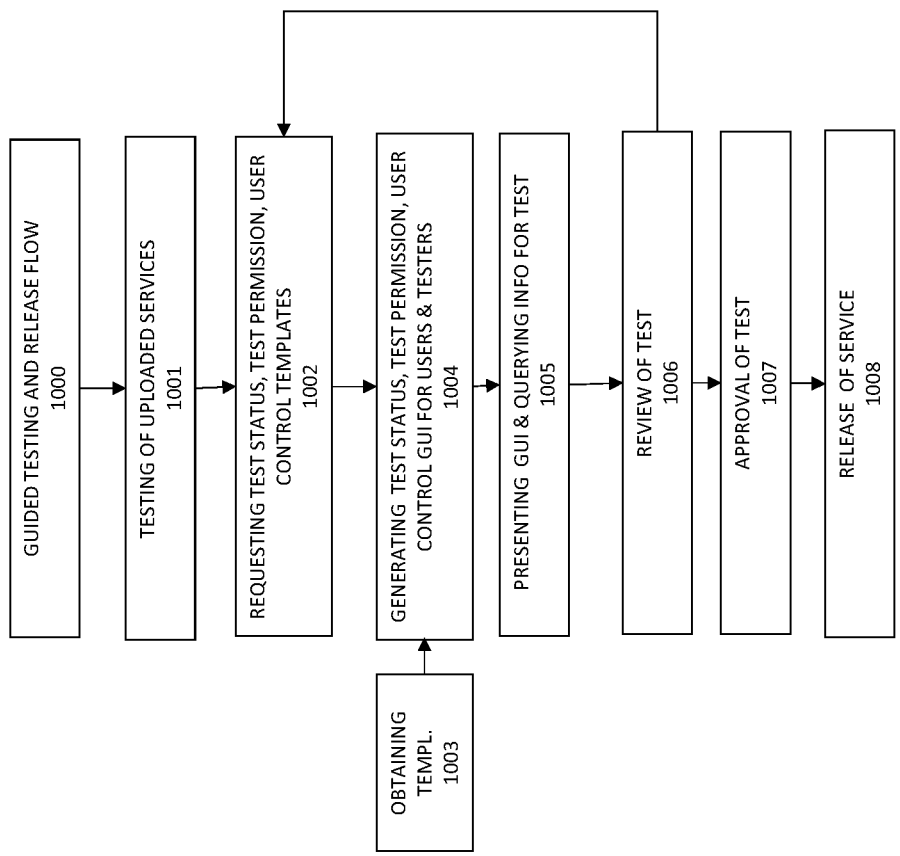
FIG. 10 illustrates a flowchart of a method for a guided onboarding test of network services and release of network services in a marketplace platform according to one or more embodiments.

FIG. 10 illustrates a flowchart of a method 1000 for a guided onboarding test of network services and release of network services in a marketplace platform according to one or more embodiments. Referring to FIG. 10, in step 1001, the EOP module 310 connects to a review/testing team to notify (e.g., guide) the team of the start of an onboarding test of the product (e.g., network service). To this end, in step 1002, the EOP module 310 can request templates for the onboarding test from the UIM module 320. In step 1004, in an example embodiment, the UIM module 320 may provide the onboarding test templates to the EOP module 310.

In step 1002, in an example embodiment, the EOP module 310 can request the templates for guiding the review/testing team through the onboarding test from the service testing module 360. According to this embodiment, the service testing module 360 can provide the templates for guiding the test to the EOP module 310 in step 1003.

In step 1004, the EOP module 310, generates an onboarding test GUI to allow (e.g., guide) the review/testing team (i.e., the platform administration side such as the content/product team) to work through onboarding test information defined by the network operators.

In step 1004, in one example embodiment, the onboarding test information may include test states such as a sandbox, a staging, a productivity test stage, etc. In particular, the onboarding test information may include preparation information for a test environment and test routine information on which and how to commence the onboarding test as defined by the network operator. The onboarding test information may have the advantage for the network operator to maintain a common standard or format for onboarding tests of products of all new users (e.g., service providers) of the marketplace platform 300.

Still referring to step 1004, in an example embodiment, the onboarding test GUI may include test preparation information, test routine information, test permission information, etc. In an example embodiment, the onboarding test GUI may include test preparation information, test routine information, test permission information, etc. for each test state (e.g., sandbox state, staging state, productivity state, etc.). In an example embodiment, each test state can refer to a milestone of the onboarding test. In one example embodiment, the test states can be indicative of the test progress of the product in a test environment (e.g., in the service testing module 360, etc.)

In an example embodiment, the onboarding test GUI may include test preparation information such as pre-arbitration (pre-ARB), app prioritization and scheduling, identity management system (IDM) creation, virtual private network (VPN) creation, resource allocation, application centric infrastructure (ACI) network preparation, perimeter network (or screened subnet) (DMZ) network preparation, open batch factory (OBF) integration, load balancer (LB) integration, etc.

In an example embodiment, the onboarding test GUI may include test routine information such as lifecycle management (LCM) testing, user acceptance testing (UAT), security assurance testing, user interface (UI)/user experience (UX) validation, stress testing, system architecture compatibility testing at target location, performance test, etc.

In an example embodiment, the onboarding test GUI may include the above test preparation information and/or test routine information as part of a sandbox test state.

Still referring to step 1004, in an example embodiment, the EOP module 310 can generate an onboarding test GUI to allow (e.g., guide) the users (i.e., the vendor/user side such as service providers) to monitor the progress of the onboarding of their product to the marketplace platform 300.

Referring to FIG. 10, in one example embodiment, in step 1004 based on the onboarding test information, as set forth above, the EOP module 310 generates an onboarding test GUI to allow a user (i.e., the vendor/user side such as service providers) to monitor the project status of the onboarding test. In one example embodiment, the onboarding GUI may include project planning tools such as progress bars, timelines, milestone diagrams, Gantt diagrams indicative of each process step of the onboarding test. To this end, in an example embodiment, the work schedule of the review/testing team regarding a product onboarding test can be shared with the users via the onboarding test GUI.

Still referring to FIG. 10, in an example embodiment, the EOP module 310 can generate an onboarding test GUI to allow a user to monitor the test progress of the onboarding of its product (e.g., dashboard information, an onboarding portal, a welcome page of an onboarding portal, etc.)

In an example embodiment, the EOP module 310 can generate an onboarding test GUI to allow the user to monitor the performance status of the product at each test state (e.g., at a sandbox state, a staging state, a productivity state, etc.). To this end, the GUI can generate and present an overview (e.g., a list or a table) illustrating the performance of the product (e.g., the network service applications) at different test states during the onboarding test.

In an example embodiment, the EOP module 310 may generate an onboarding test GUI that allows a user to obtain information about the test routine, such as block diagrams, schematics, etc., explaining the content of the test to be applied to the product in the test environment.

In an example embodiment, the EOP module 310 can generate an onboarding test GUI to allow a user to monitor when, where (e.g., at what test state or in which module of the test environment). In an example embodiment, onboarding test GUI may allow a user to monitor which test event was applied to the product (e.g., the network service).

In an example embodiment, the EOP module 310 can generate an onboarding test GUI to allow a user to monitor whether the product (e.g., the network service) passed or failed a test event that was worked through by the review/ testing team. Alternatively, in an example embodiment, the EOP module 310 can generate an onboarding test GUI to allow a user to monitor onboarding when, where and which test event has been completed.

In an example embodiment, the EOP module 310 can generate an onboarding test GUI to allow a user to manage the access to the product under test (e.g., the user's staff which has access rights to the product (e.g., network service) under test and/or test environment.

Still referring to step 1004, the EOP module 310, in an example embodiment, can generate an onboarding test GUI to allow (e.g., guide) review/testing team (i.e., the platform administration side such as content/product team) and the users (i.e., the vendor/user side such as service providers) to interact during the onboarding test. In an example embodiment, the EOP module 310, based on the onboarding test GUI, can generate a user control GUI. The user control GUI may allow the network operator to manage the user access tasks. The user control GUI may present user access requests to modules of the test environment (e.g., user access requests to functions within the test environment).

In an example embodiment, the user control GUI may present user access requests to the product (e.g., network service) under test. In an example embodiment, the user control GUI may allow the review/testing team to schedule the time and location of the user access. For example, the review/testing team (i.e., the platform administration side such as the content/product team) can create work orders for users in accordance with the users' access status, etc.

The user control GUI may be defined by the network operator to maintain a common standard or format for onboarding tests of products of all new users (e.g., service providers) of the marketplace platform 300.

In an example environment, the onboarding test GUI can generate a permission GUI to allow (e.g., guide) the review/testing team (i.e., the platform administration side such as the content/product team) to manage the permission of users to access the test environment.

Still referring to FIG. 10, in step 1005, the EOP module 310, depending on example embodiments, can present the onboarding test GUI to the review/testing team (i.e., the platform administration side such as the content/product team) or the users (i.e., the vendor/user side such as the service providers).

In step 1006, the review/testing team reviews the onboarding test and approve or reject the product (e.g., network service). In an example embodiment, in the case that the product (e.g., network service) fails some test events, but passes other test events, the EOP module 310 can generate and present an onboarding test GUI to allow (e.g., guide) the review/testing team and the users to interact during the onboarding test.

As set forth above, in steps 1004 and 1005, the EOP module 310 generates an onboarding test GUI for an interaction between the review/testing team and the users. To this end, in an example embodiment, onboarding test GUI may include input fields to request comments to the onboarding test that may allow (e.g., guide) the user to directly input the requested information in the required fields, and can provide the review/testing team (i.e., the platform administration side such as content/product team) with additional product information (e.g., an information query for troubleshooting during the onboarding test).

In step 1007, once the review/testing team (i.e., the platform administration side such as the content/product team) approved the onboarding test, the EOP module 310 requests the temporary repository 340 to transfer the network service to the product manager module 351.

In step 1008, the cloud orchestration module 352 releases the network service to the marketplace platform 300 (e.g., step 1008 is similar to step 708 in FIG. 7).

Figure 11:
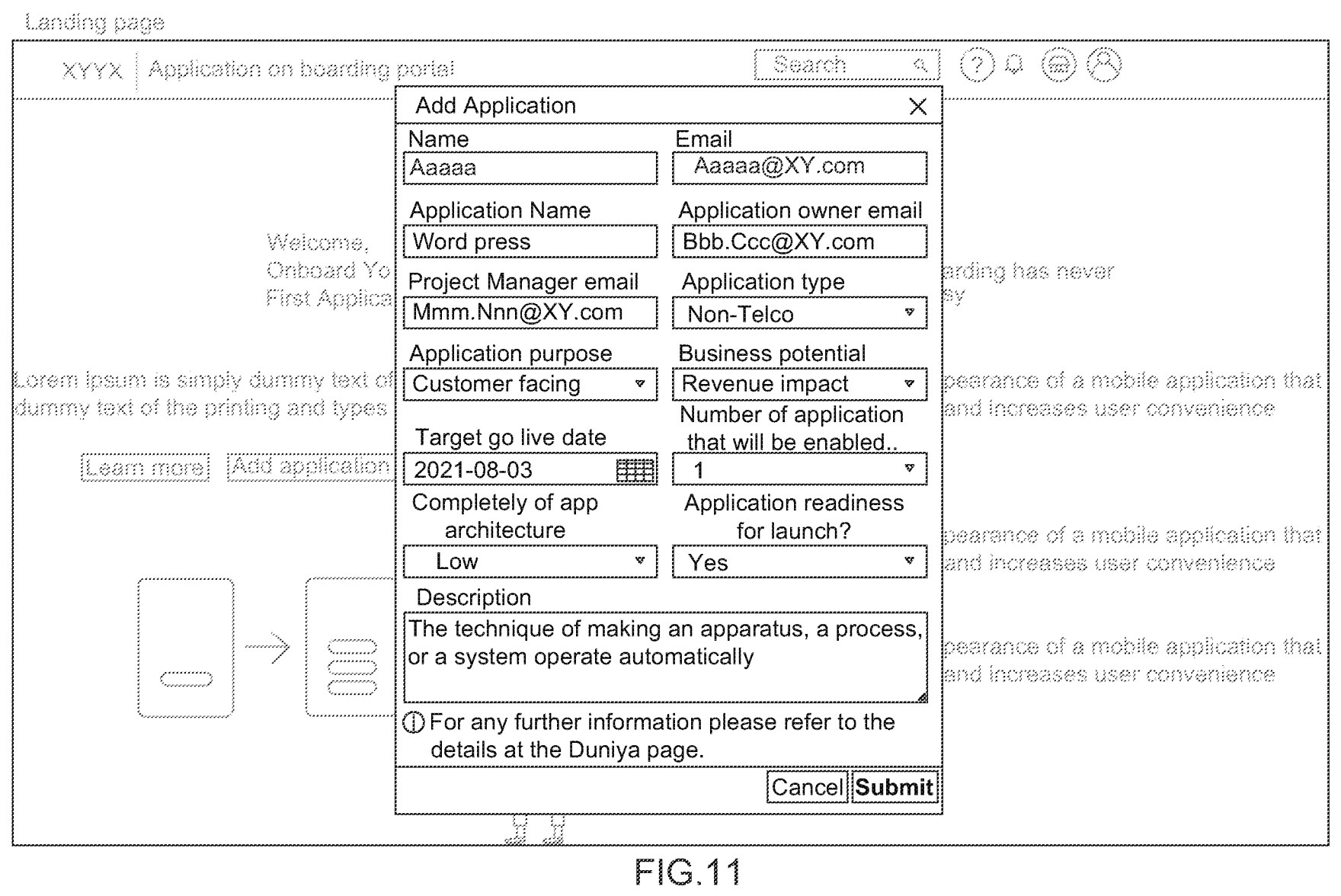

FIG. 11 illustrates one non-limiting exemplary embodiment of a product information GUI portal for onboarding products to the marketplace. From here, the user inputs information about the product to be on boarded to the marketplace. In one example embodiment, the product information GUI portal of FIG. 11 may be generated and/or populated by the EOP module 310 based on product information data retrieved from the UIM module 320.

Figure 12:
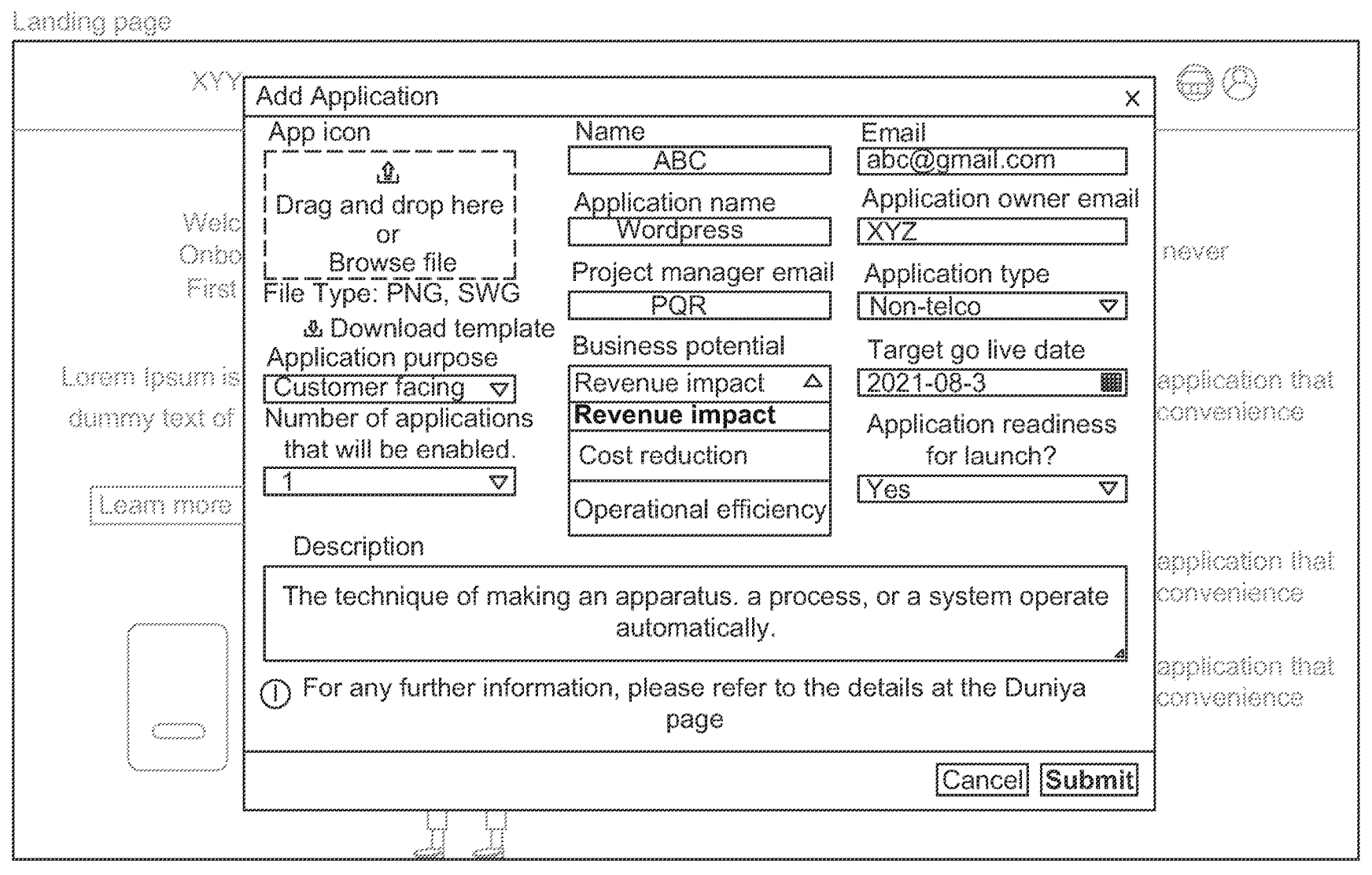

FIG. 12 illustrates one non-limiting exemplary embodiment of a product upload GUI portal for onboarding products to the marketplace. From here, the user uploads the product and input the information of the product to be on boarded to the marketplace. In one example embodiment, the product information GUI portal of FIG. 12 may be generated and/or populated by the EOP module 310 based on product information data retrieved from the UIM module 320.

Figure 13:
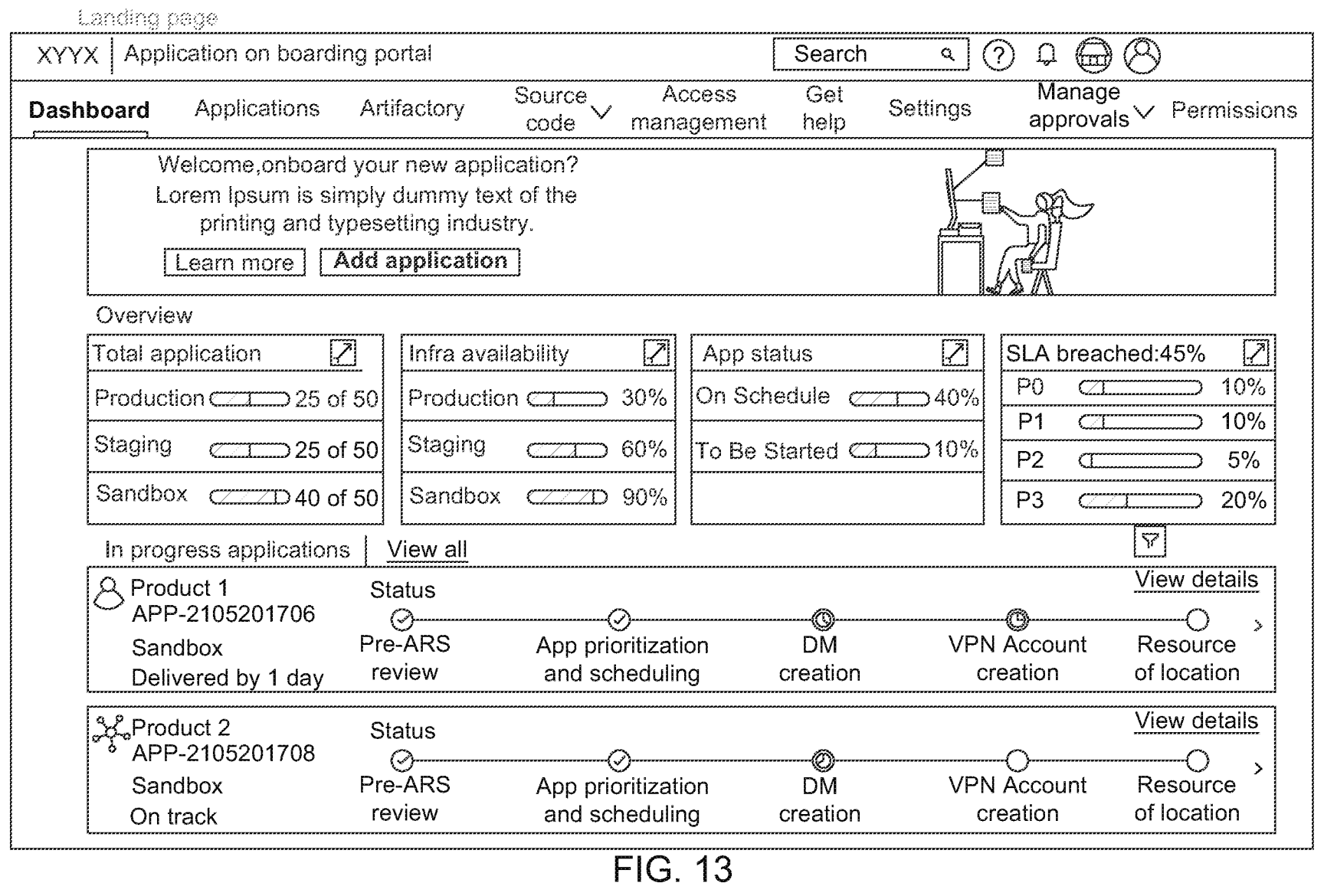

FIG. 13 illustrates one or more non-limiting exemplary embodiments of an onboarding test GUI portal for evaluating a product to be on boarded to the marketplace. From here, the user obtains the evaluation progress of a product to be on boarded to the marketplace. The user who may have already on boarded products to the marketplace requests the onboarding of a product to the marketplace. For example, the EOP module 310 can provide interactive elements (e.g., "add application" button, etc.) to detect the user's new onboarding request. In an example embodiment, the onboarding test GUI portal of FIG. 13 may be generated and/or populated by the EOP module 310 based on product information data retrieved from the UIM module 320. In another example embodiment, the onboarding test GUI portal of FIG. 13 may be generated and/or populated by the EOP module 310 based on product information data retrieved from the service testing module 360.

FIG. 14 illustrates one or more non-limiting exemplary embodiments of an onboarding test GUI portal for evaluating a product to be onboarded to the marketplace. From here, the user obtains information about the test environment, the product test priority, the start and target dates of test events, the status of the test events, etc. In an example embodiment, the onboarding test GUI portal of FIG. 14 may be generated and/or populated by the EOP module 310 based on product information data retrieved from the UIM module 320. In an example embodiment, the onboarding test GUI portal of FIG. 14 may be generated and/or populated by the EOP module 310 based on product information data retrieved from the service testing module 360.

Figure 15A:
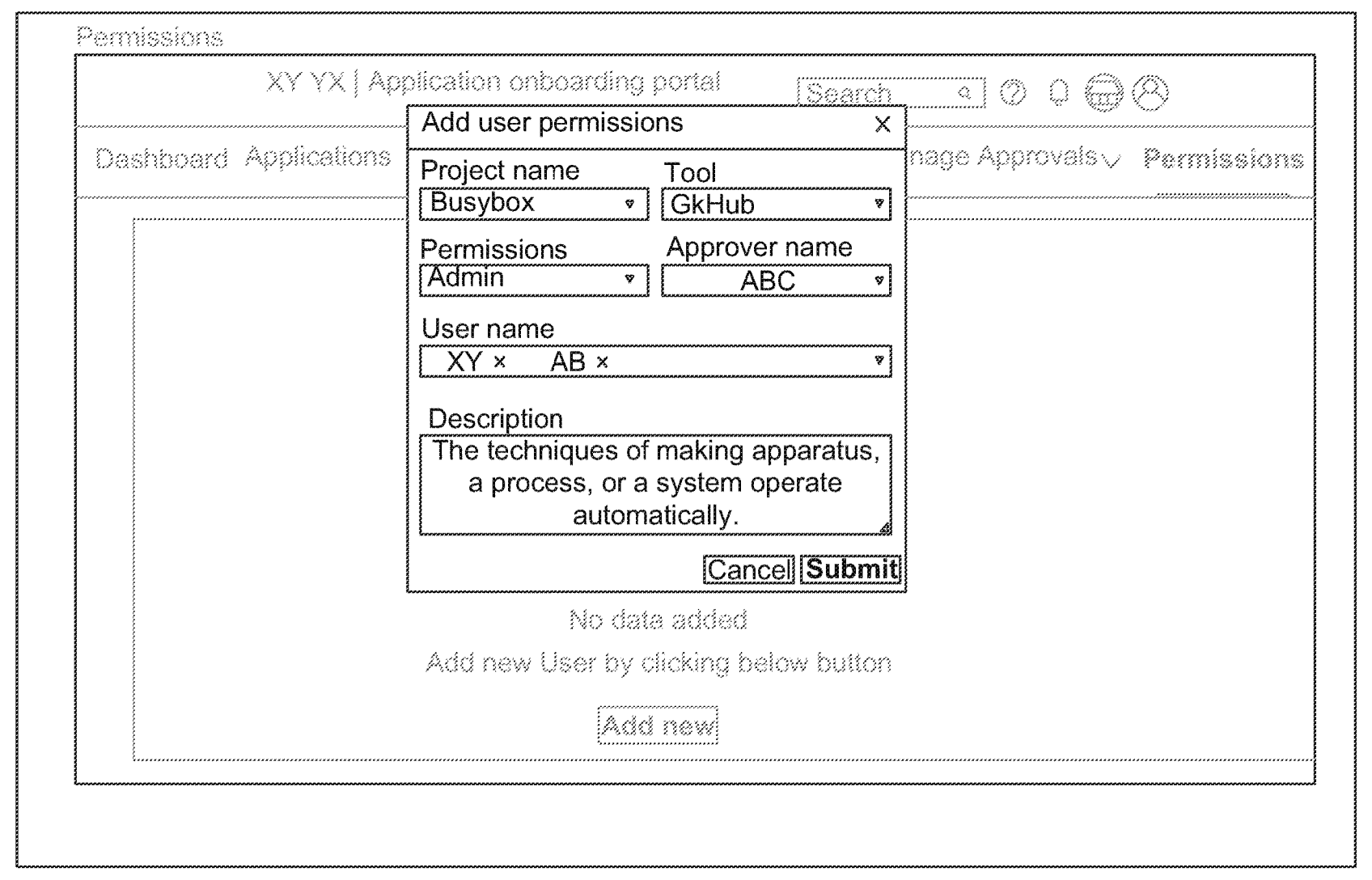

FIGS. 15A and 15B illustrate one or more non-limiting exemplary embodiments of a permission GUI portal for evaluating a product to be on boarded to the marketplace. From here, in FIG. 15A, the platform administrator (e.g., the network operator or review/testing team, etc.) inputs (i.e., manages) the permission rights of users to access the test environment on the marketplace platform 300 (e.g., the service testing module 360). In FIG. 15B, in an example embodiment, the platform administrator (e.g., the network operator or review/testing team, etc.) can manage (e.g., modify or cancel) user permission. In an example embodiment, the onboarding test GUI portal of FIGS. 15A and 15B may be generated and/or populated by the EOP module 310 based on product information data retrieved from the service testing module 360.

Example embodiments of the present disclosure provide a method and system in which enrollment and onboarding processes of network services, as opposed to manually onboarding network services on-site, are simplified and automated. The centralized enrollment and onboarding processes can save time and resources, and, in particular, the automation minimizes human errors and compatibility failures and improves customer satisfaction and reduces business risks for users (e.g., service providers), among other benefits. Further, by automating the enrollment and onboarding of users (e.g., service providers) in a centralized and guided manner, the online marketplace platform provides customers (e.g., network operators) with a simple, flexible, cost-effective, efficient, and rapidly implementable solution for network service selection. For the user (e.g., service providers), the enrollment and onboarding process of network services provides a low-risk test environment with minimal impact on the customer (e.g., network operators) to provide a high-quality service without burdening customers with a high volume of requests.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for onboarding virtualized network services to a centralized marketplace, the system comprising:
   a memory storing instructions, and
   at least one processor configured to execute the instructions to:
      receive a user request of a first user to access the centralized marketplace;
      authenticate, based on the received user request, the first user;
      obtain product information of a product of the authenticated first user based on a predetermined onboarding policy, the product being a virtualized network service for a telecommunications network;
      obtain, based on the predetermined onboarding policy, the product for performing one or more onboarding tests of the product in a test environment of the centralized marketplace, wherein the onboarding tests are managed through an onboarding test graphical user interface (GUI) and comprise test preparation information, test routine information, and test states;
      obtain status information of the one or more onboarding tests; and
      present the product for purchase in the central marketplace based on a result of the one or more onboarding tests.

2. The system according to claim 1, wherein the at least one processor, while authenticating, is further configured to execute the instructions to:
   determine a role of the first user registered in the centralized marketplace to be a vendor role, from among a plurality of predetermined roles comprising the vendor role and a customer role; and
   provide access to the centralized marketplace based on the determined role of the first user to be the vendor role.

3. The system according to claim 1, wherein the at least one processor, while obtaining of the product information, is further configured to execute the instructions to:
   receive an onboarding request by the first user; and
   output a product information GUI to request the first user to provide product information of the product.

4. The system according to claim 1, wherein the at least one processor, while obtaining of the product information, is further configured to execute the instructions to:
   output an upload GUI to request the first user to provide additional product information and to upload the product;
   obtain the additional product information and the product uploaded by the first user; and
   provide the additional product information for the product for verification by at least one second user.

5. The system according to claim 1, wherein the at least one processor, while obtaining the status information, is further configured to execute the instructions to:
   output, to at least one second user, the onboarding test GUI, the onboarding test GUI comprising information on the one or more onboarding tests of the product in the test environment; and
   obtain the status information of the one or more onboarding tests from the at least one second user.

6. The system according to claim 5, wherein the at least one processor is further configured to execute the instructions to:
   based on an access request received from the first user or the at least one second user, provide access to the first user to update the product in response to the status information.

7. The system according to claim 6, wherein the at least one processor, while evaluating of the product, is further configured to execute the instructions to:
   receive, from the at least one second user, a query input to request information from the second user in relation to the one or more onboarding tests; and
   output the query input to the first user.

8. The system according to claim 1, wherein the at least one processor is further configured to execute the instructions to:
   output, to the first user, the onboarding test GUI comprising the status information for the one or more onboarding tests.

9. The system according to claim 8, wherein the status information comprises at least one of:
   an onboarding test completion status;
   an onboarding test event and/or result; and
   a performance status of the product during the one or more onboarding tests.

10. The system according to claim 1, wherein the test preparation information comprises at least one of: pre-arbitration (pre-ARB), application prioritization and scheduling, identity management system (IDM) creation, virtual private network (VPN) creation, resource allocation, application-centric infrastructure (ACI) network preparation, perimeter network (DMZ) network preparation, open batch factory (OBF) integration, or load balancer (LB) integration.

11. The system according to claim 1, wherein the test routine information comprises at least one of: lifecycle management (LCM) testing, user acceptance testing (UAT), security assurance testing, user interface (UI)/user experience (UX) validation, stress testing, system architecture compatibility testing at target location, or performance testing.

12. The system according to claim 1, wherein the test states comprise at least one of: a sandbox state, a staging state, or a productivity state.

13. A method for onboarding virtualized network services to a centralized marketplace, the method comprising:
receiving a user request of a first user to access the centralized marketplace;
authenticating, based on the received user request, the first user;
obtaining product information of a product of the authenticated first user based on a predetermined onboarding policy, the product being a virtualized network service for a telecommunications network;
obtaining, based on the predetermined onboarding policy, the product for performing one or more onboarding tests of the product in a test environment of the centralized marketplace, wherein the onboarding tests are managed through an onboarding test graphical user interface (GUI) and comprise test preparation information, test routine information, and test states;
obtaining status information of the one or more onboarding tests; and
presenting the product for purchase in the central marketplace based on a result of the one or more onboarding tests.

14. The method according to claim 13, wherein the authenticating comprises:
determining a role of the first user registered in the centralized marketplace to be a vendor role, from among a plurality of predetermined roles comprising the vendor role and a customer role; and
providing access to the centralized marketplace based on the determined role of the first user to be the vendor role.

15. The method according to claim 13, wherein the obtaining of the product information comprises:
receiving an onboarding request by the first user; and
outputting a product information GUI to request the first user to provide product information of the product.

16. The method according to claim 13, wherein the obtaining of the product comprises:
outputting an upload GUI to request the first user to provide additional product information and to upload the product;
obtaining the additional product information and the product uploaded by the first user; and
providing the additional product information for the product for verification by at least one second user.

17. The method according to claim 13, wherein the obtaining the status information comprises:
outputting, to at least one second user, the onboarding test GUI, the onboarding test GUI comprising information on the one or more onboarding tests of the product in the test environment; and
obtaining the status information of the one or more onboarding tests from the at least one second user.

18. The method according to claim 17, further comprising:
based on an access request received from the first user or the at least one second user, provide access to the first user to update the product in response to the status information.

19. The method according to claim 18, wherein the evaluating of the product further comprising:
receiving, from the at least one second user, a query input to request information from the second user in relation to the one or more onboarding tests; and
outputting the query input to the first user.

20. The method according to claim 13, further comprising:
outputting, to the first user, the onboarding test GUI comprising the status information for the one or more onboarding tests.

21. The method according to claim 20, wherein the status information comprises at least one of:
an onboarding test completion status;
an onboarding test event and/or result; and
a performance status of the product during the one or more onboarding tests.

* * * * *